United States Patent
Nakada et al.

(10) Patent No.: US 11,181,743 B2
(45) Date of Patent: Nov. 23, 2021

(54) HEAD UP DISPLAY APPARATUS AND DISPLAY CONTROL METHOD THEREOF

(71) Applicant: MAXELL, LTD., Kyoto (JP)

(72) Inventors: Takumi Nakada, Kyoto (JP); Toshimitsu Watanabe, Kyoto (JP); Nozomu Shimoda, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/757,801

(22) PCT Filed: Oct. 12, 2018

(86) PCT No.: PCT/JP2018/038165
§ 371 (c)(1),
(2) Date: Apr. 21, 2020

(87) PCT Pub. No.: WO2019/097918
PCT Pub. Date: May 23, 2019

(65) Prior Publication Data
US 2021/0165220 A1  Jun. 3, 2021

(30) Foreign Application Priority Data
Nov. 14, 2017  (JP) .............................. JP2017-218741

(51) Int. Cl.
*G09G 5/00* (2006.01)
*G02B 27/01* (2006.01)
(Continued)

(52) U.S. Cl.
CPC ............ *G02B 27/0172* (2013.01); *B60R 1/00* (2013.01); *G02B 27/0176* (2013.01); *G06T 7/70* (2017.01);
(Continued)

(58) Field of Classification Search
CPC .. G01C 21/36; G06F 3/14; G06T 3/00; G06T 11/00; G06T 11/203
(Continued)

(56) References Cited

U.S. PATENT DOCUMENTS

2009/0231116 A1* 9/2009 Takahashi .............. B60K 35/00
340/461
2010/0066832 A1* 3/2010 Nagahara ............. G02B 7/1822
348/148
(Continued)

FOREIGN PATENT DOCUMENTS

JP  2010-070066 A   4/2010
JP  2015-221633 A   12/2015
(Continued)

OTHER PUBLICATIONS

International Search Report of PCT/JP2018/038165 dated Dec. 25, 2018.

*Primary Examiner* — Gordon G Liu
(74) *Attorney, Agent, or Firm* — Mattingly & Malur, PC

(57) ABSTRACT

In relation to a HUD apparatus having an AR function, the shift between an object and a virtual image (AR image) is reduced. The HUD apparatus extracts a predetermined object based on an image taken by an external camera, acquires object information including an object position in space, viewpoint position information of a driver and the amount of movement of the viewpoint position in space based on an image taken by an internal camera, and information including a position of a virtual image region in space. The HUD apparatus generates the image to be superimposed on the object, and corrects a display position of the image in the virtual image region including at least a position in a horizontal direction, and performs conversion processing at the time of the correction so that a virtual (Continued)

image region is set as a display position of the image after correction.

7 Claims, 23 Drawing Sheets

(51) Int. Cl.
  *G06T 7/70*  (2017.01)
  *B60R 1/00*  (2006.01)
  *G09G 3/00*  (2006.01)
  *G09G 5/38*  (2006.01)
(52) U.S. Cl.
  CPC ............ *G09G 3/001* (2013.01); *G09G 5/38* (2013.01); *B60R 2300/105* (2013.01); *B60R 2300/205* (2013.01); *B60R 2300/304* (2013.01); *G02B 2027/011* (2013.01); *G02B 2027/0159* (2013.01); *G06T 2207/30268* (2013.01); *G09G 2354/00* (2013.01); *G09G 2380/10* (2013.01)
(58) Field of Classification Search
  USPC ....................................................... 345/681
  See application file for complete search history.

(56) References Cited

U.S. PATENT DOCUMENTS

2018/0157037 A1    6/2018  Kasazumi et al.
2019/0178669 A1*   6/2019  Lee .................... G01C 21/365

FOREIGN PATENT DOCUMENTS

| JP | 2017-015918 A | 1/2017 |
| JP | 2017-052364 A | 3/2017 |
| JP | 2017-157093 A | 9/2017 |

* cited by examiner

WINDSHIELD, VISIBLE REGION

CASE OF NO POSITION SHIFT BETWEEN REAL IMAGE (OBJECT) AND VIRTUAL IMAGE (AR IMAGE)

SETTING EXAMPLE IN VIRTUAL IMAGE REGION

AR SETTING EXAMPLE :

| TYPE OF OBJECT | TYPE OF AR IMAGE | CORRECTION FUNCTION | ............ |
|---|---|---|---|
| CAR (K1) | G1 | APPLIED | ...... |
| PERSON (K2) | G2 | APPLIED | ...... |
| ......(K3) | G3 | NOT APPLIED | ...... |
| ...... | ...... | ...... | ...... |

FIG. 10
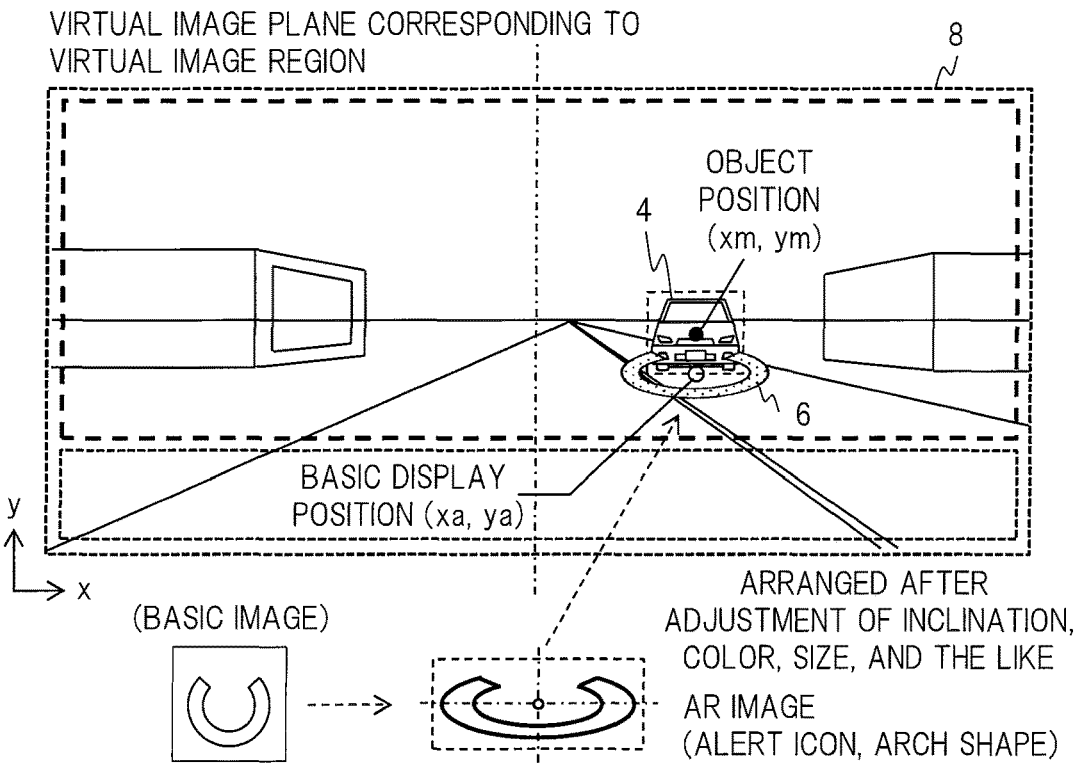
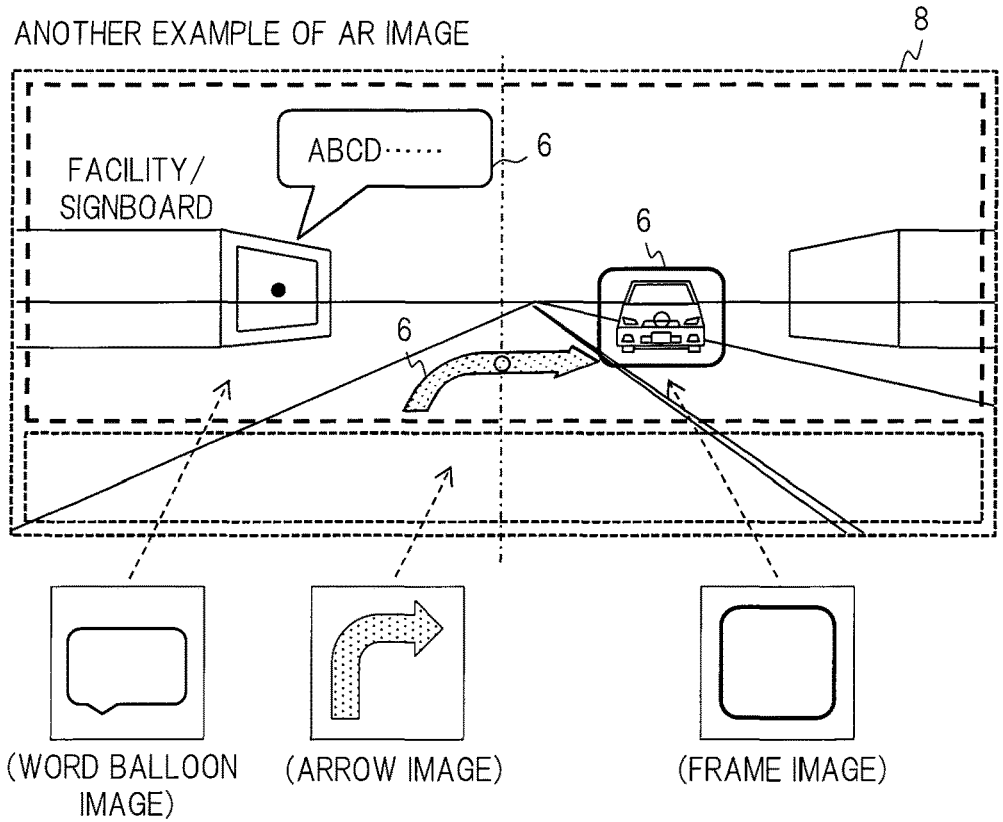

FIG. 12
CORRECTION METHOD IN ACCORDANCE WITH AMOUNT OF MOVEMENT OF VIEWPOINT POSITION
(A) VIEWPOINT POSITION Ex1
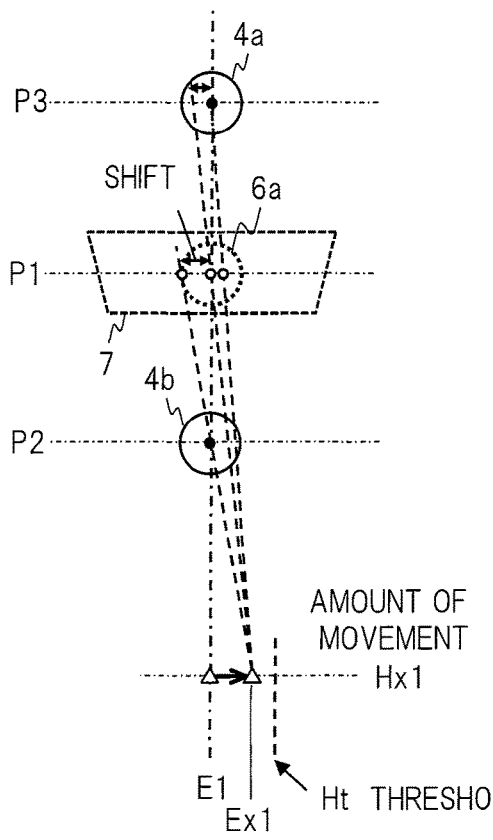
MOVEMENT IS WITHIN THRESHOLD VALUE
→ SHIFT IS ACCEPTABLE
→ NOT CORRECTED
(B) VIEWPOINT POSITION Ex2
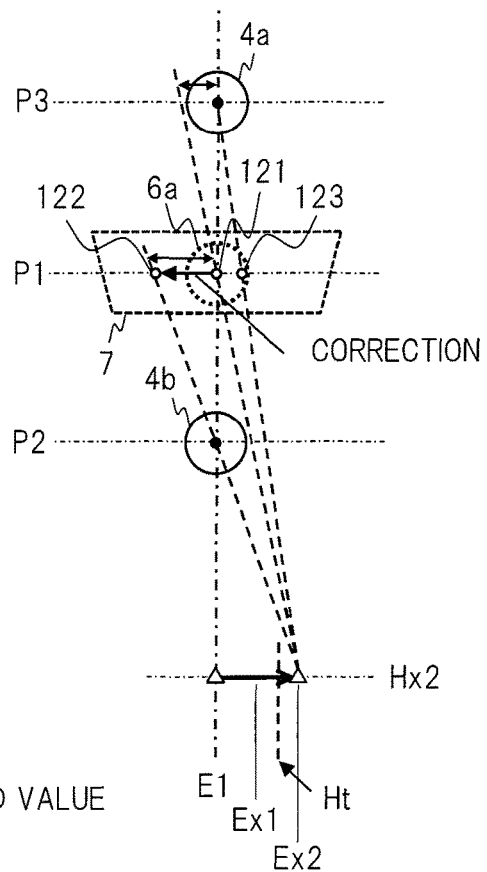
MOVEMENT EXCEEDS THRESHOLD VALUE
→ SHIFT IS NOT ACCEPTABLE
→ CORRECTED

FIG. 13
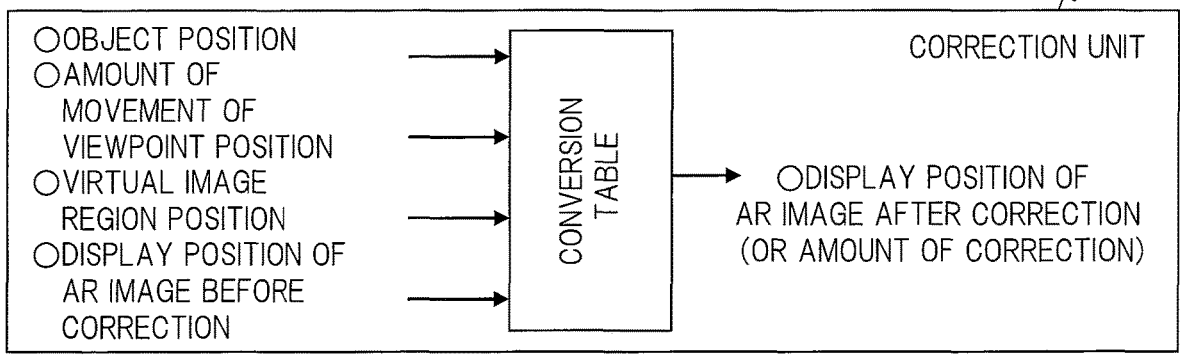
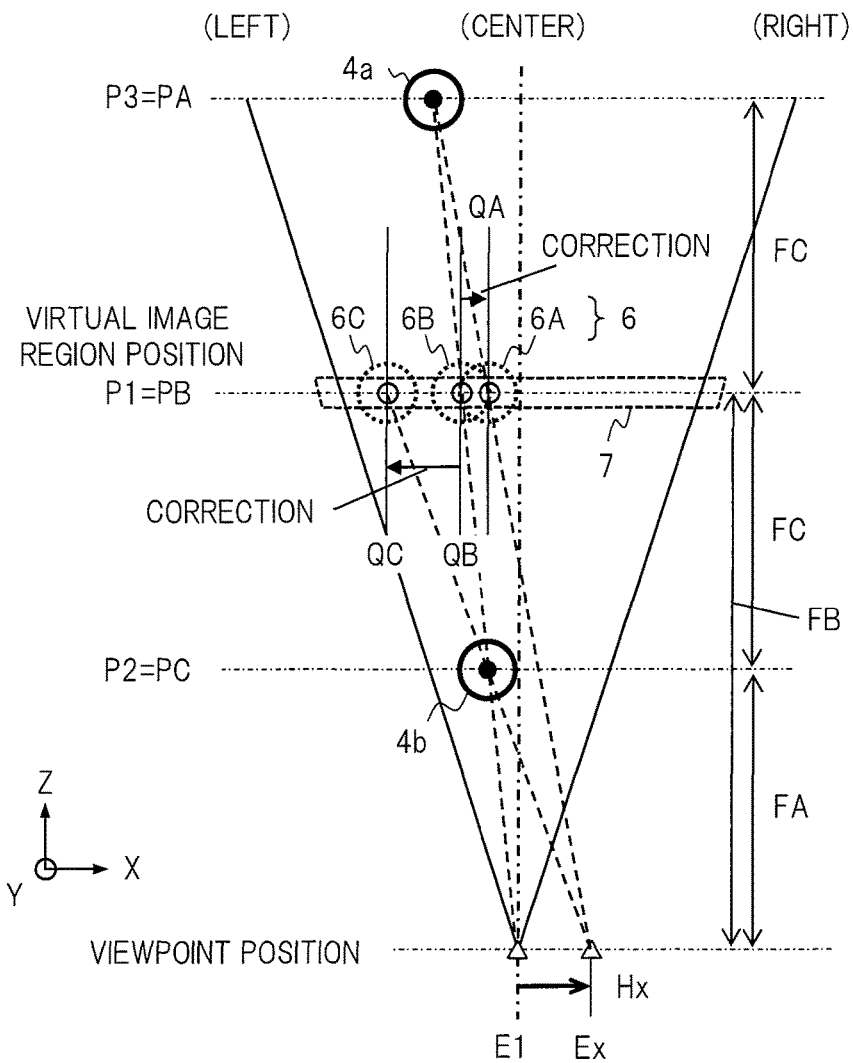
RIGHTWARD MOVEMENT

FIG. 15
(A) EXAMPLE OF OBJECT VIEWED FROM VIEWPOINT POSITION OF BASIC SETTING
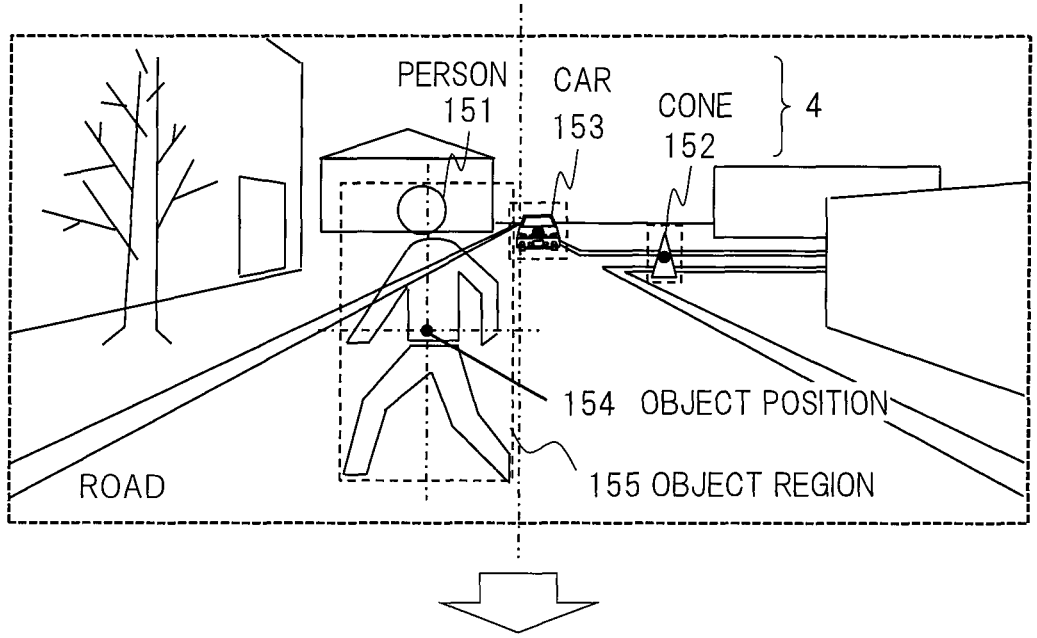
(B) EXAMPLE OF SUPERIMPOSED DISPLAY OF AR IMAGE VIEWED FROM VIEWPOINT POSITION OF BASIC SETTING
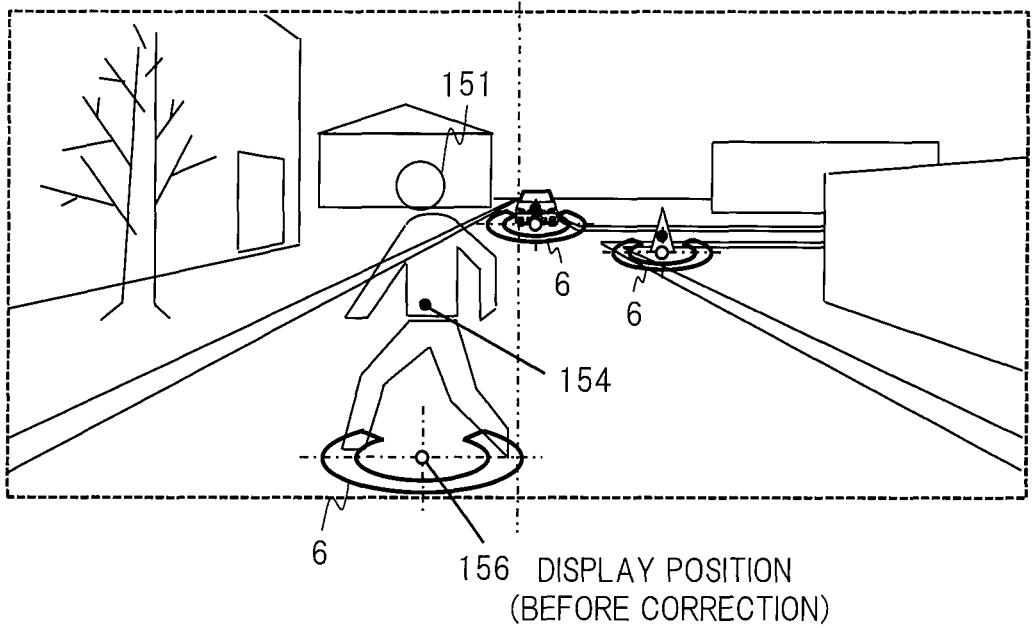

(MODIFICATION)

FIG. 22
EXAMPLE OF SHIFT WHEN VIEWPOINT MOVES IN FIRST HUD APPARATUS
(A) LEFTWARD MOVEMENT, MIDDLE DISTANCE
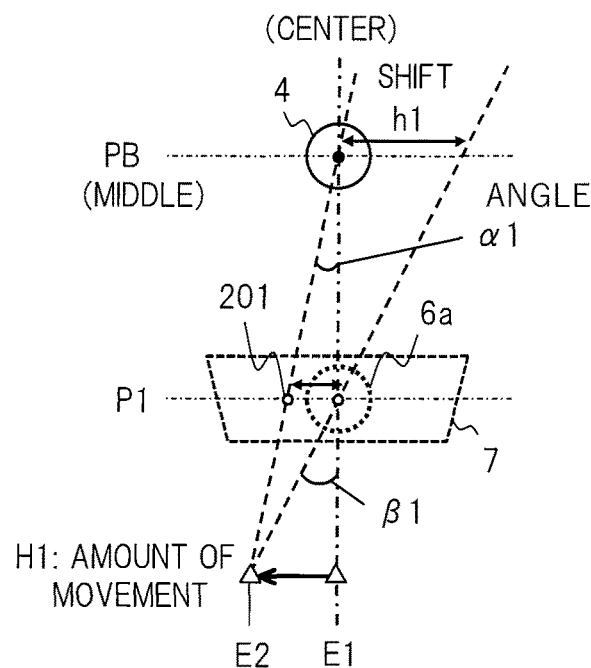
(B) RIGHTWARD MOVEMENT, MIDDLE DISTANCE
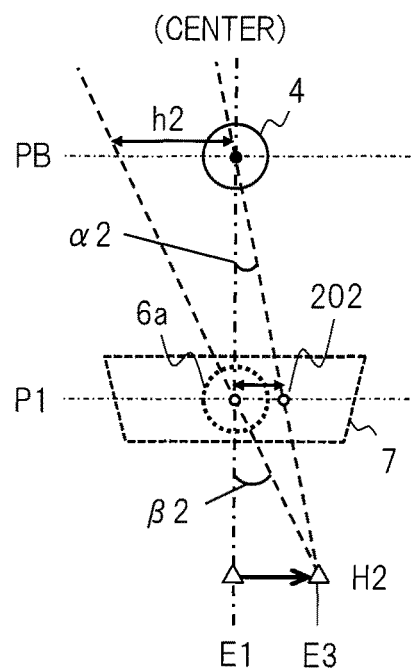
(C) LEFTWARD MOVEMENT, FAR/CLOSE DISTANCE
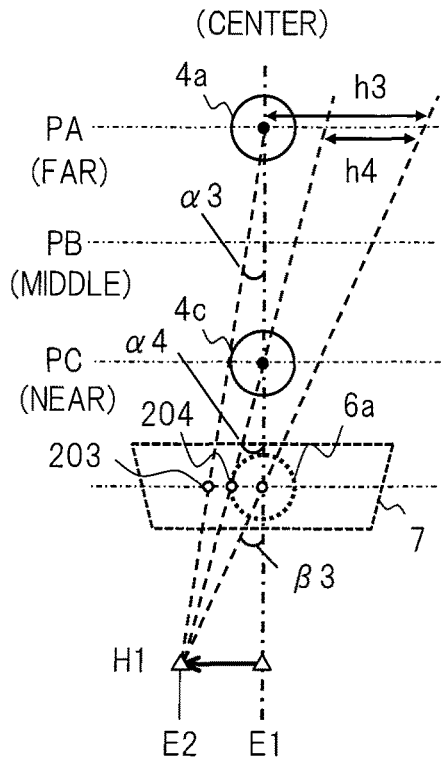
(D) LEFTWARD MOVEMENT, LEFT AND RIGHT POSITIONS WITH MIDDLE DISTANCE
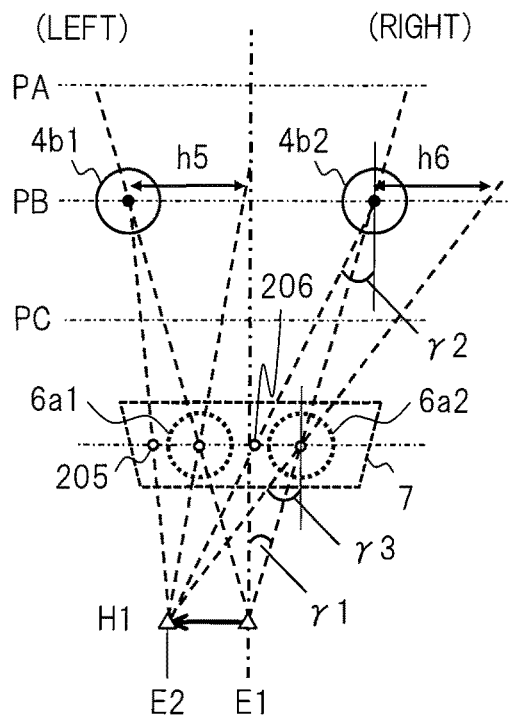

FIG. 23
EXAMPLE OF SHIFT WHEN VIEWPOINT MOVES IN SECOND HUD APPARATUS
(A) LEFTWARD MOVEMENT, FRONT/BACK POSITIONS (CENTER)
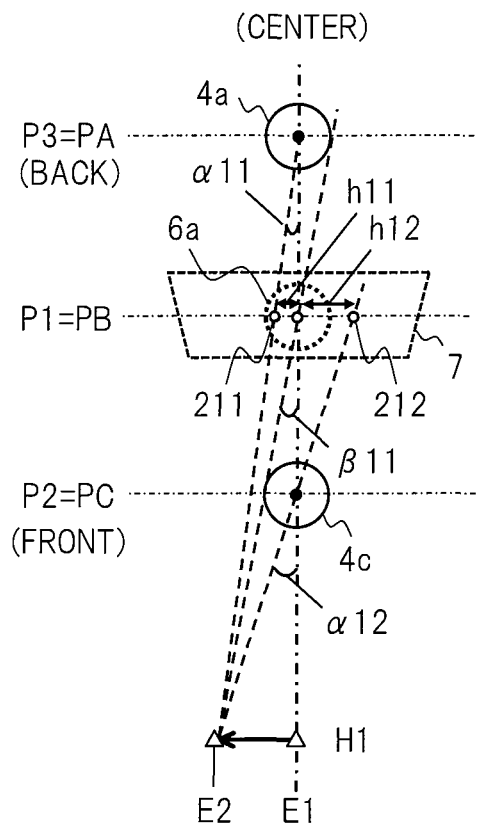
(B) RIGHTWARD MOVEMENT, FRONT/BACK POSITIONS (CENTER)
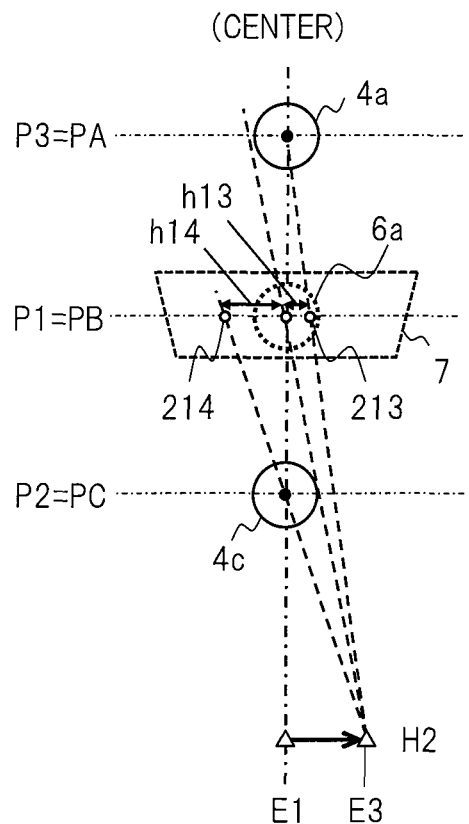

HEAD UP DISPLAY APPARATUS AND DISPLAY CONTROL METHOD THEREOF

TECHNICAL FIELD

The present invention relates to a technology of a display apparatus such as a head up display (HUD) apparatus, and relates to a technology for providing image information of augmented reality (AR) to a driver.

BACKGROUND ART

As an AR display apparatus having an AR function and a system thereof, there is a HUD apparatus mounted on an automobile or the like. In the HUD apparatus (sometimes referred to as an AR-HUD), a virtual image is displayed to be superimposed on a transmitted real image by projecting image light to a visible region of a windshield, a combiner, or the like in a field of view of a user such as a driver. The visible region is a region where the user can visually recognize the image. Hereinafter, a virtual image may be described as an AR image. The virtual image includes, for example, image information for driving assistance and the like relative to a real image including a road, a car, and the like in front of an own vehicle. Specific examples of the virtual image include an image of vehicle information such as a vehicle speed, an arrow image for navigation of a traveling direction, and an icon image for alerting or highlighting the approach of a car, a person, a bicycle, or the like. Further, as the original data for generating the virtual image, information of an in-vehicle sensor, an engine control unit, a car navigation system, and the like can be used.

The HUD apparatus includes, for example, a display element, a light source, and an optical system. The optical system includes a lens, a mirror, and the like for guiding image light to the visible region. The image light from the display element is projected through the mirror and the like to a predetermined region within the visible region of a windshield, a combiner, or the like. The light reflected in the predetermined region enters the eyes of the driver and forms an image on the retina, and is recognized as a virtual image by the driver. A virtual image region which is a region where the virtual image can be seen is formed in front of the viewpoint of the driver through the visible region so as to correspond to the predetermined region.

Japanese Patent Application Laid-Open Publication No. 2010-70066 (Patent Document 1) is an example of a related art regarding an in-vehicle HUD apparatus. Patent Document 1 describes an invention for a head up display, in which visibility of displayed information is improved by reducing a projection position of an image from being shifted from a line of sight of one eye due to the vibration of a vehicle or the change in the posture of a driver.

RELATED ART DOCUMENTS

Patent Documents

Patent Document 1: Japanese Patent Application Laid-open Publication No. 2010-70066

SUMMARY OF THE INVENTION

Problems to be Solved by the Invention

In a conventional in-vehicle system including a HUD apparatus, a virtual image including an AR image is displayed to be superimposed on a real image of an object in a virtual image region through a visible region of a windshield or the like by using an AR function. At that time, depending on the position of the driver's eyes (may be referred to as a viewpoint position), a position shift may occur between the object and the AR image. In other words, the display position of the AR image determined so as to match the object position in design and calculation by the HUD apparatus does not match the object position in actual visual recognition by the driver in some cases. For example, the cause of the shift between the object and the AR image is that the eye position is displaced from a viewpoint position of a basic setting (eye box corresponding to a range including the viewpoint position) due to an action of changing the posture, an action of moving the head by the driver, or the like.

As an example, when the viewpoint position moves to the left or right in the horizontal direction from the viewpoint position of the basic setting, the shift in the horizontal direction occurs between the object position and the display position of the AR image as viewed from the viewpoint position after movement. The larger the amount of movement of the viewpoint position, the larger the shift. As the shift becomes larger, the visual recognition in which the object and the AR image are associated with each other becomes more difficult or impossible for the driver. Such AR images are unsuitable.

An object of the present invention is to provide a technology capable of realizing a suitable AR display by reducing a shift between an object and a virtual image (AR image) in relation to a technology of a HUD apparatus having an AR function.

Means for Solving the Problems

A typical embodiment of the present invention is a head up display apparatus or the like, and is characterized by having the following configuration.

A head up display apparatus according to an embodiment is configured to project an image to a windshield or a combiner of a vehicle, thereby displaying a virtual image to be superimposed on a real image in front of the vehicle for a driver, the head up display apparatus comprises: a controller configured to perform control to display the virtual image in a visible region of the windshield or the combiner; and a display unit configured to display the virtual image in the visible region in accordance with the control of the controller, the controller extracts a predetermined object based on an image taken by an external camera, the controller acquires information including object information including an object position of the object in space, viewpoint information including a viewpoint position of the driver and the amount of movement of the viewpoint position in space based on an image taken by an internal camera, and virtual image information including a position of a virtual image region which is a range in which the virtual image can be displayed in space, the controller generates the image displayed to be superimposed on the object, the controller corrects a display position of the image in the virtual image region including at least a position in a horizontal direction by using the acquired information, the controller performs the control to the display unit by using data after the correction, and the controller performs conversion process at the time of the correction so that a position of an intersection between a straight line when viewing the object position through the visible region from a viewpoint position after movement from a viewpoint position of basic setting of the driver and the virtual image region is set as a display position of the image after correction.

Effects of the Invention

According to a typical embodiment of the present invention, it is possible to realize a suitable AR display by reducing a shift between an object and a virtual image (AR image) in relation to a technology of a HUD apparatus having an AR function.

BRIEF DESCRIPTIONS OF THE DRAWINGS

FIG. 10 is a diagram showing basics of generation of an AR image in the virtual image region according to the embodiment;

FIG. 12 is a diagram showing a correction method in accordance with the amount of movement of viewpoint position according to the embodiment;

FIG. 13 is a diagram showing a correction of a display position of the AR image according to the embodiment;

FIG. 15 is a diagram showing an example of the object and the superimposed display of the AR image seen from the viewpoint position of the basic setting according to the embodiment;

FIG. 22 is a diagram showing an example of the shift when the viewpoint moves in the case of the first HUD apparatus according to the comparative example; and FIG. 23 is a diagram showing an example of the shift when the viewpoint moves in the case of the second HUD apparatus according to the comparative example.

DETAILED DESCRIPTION OF PREFERRED EMBODIMENTS

Figure 1:
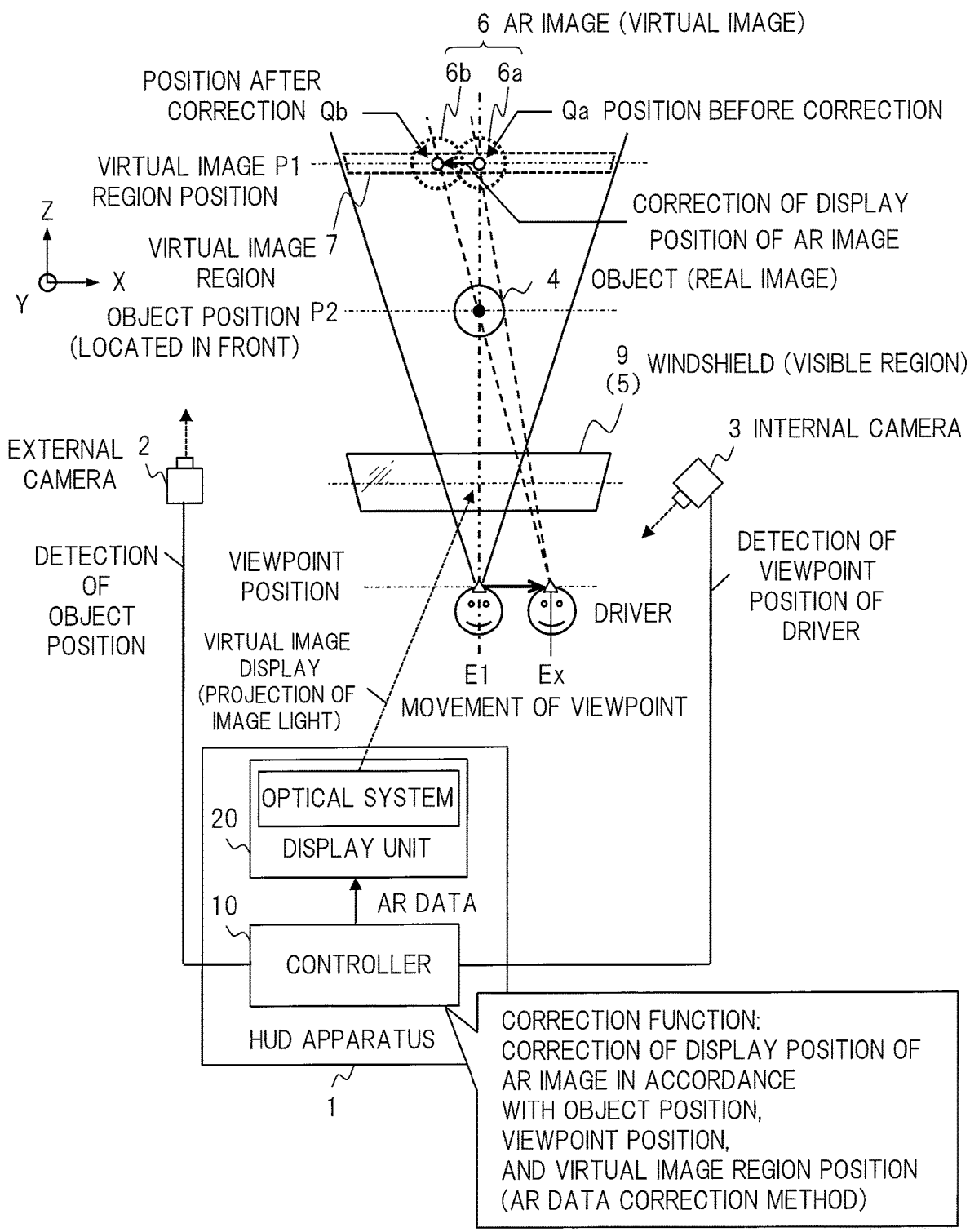
FIG. 1 is a diagram showing a schematic configuration of a HUD apparatus according to an embodiment of the present invention.

Hereinafter, an embodiment of the present invention will be described in detail with reference to drawings. Note that the same members are denoted by the same reference characters in principle throughout the drawings for describing the embodiment, and the repetitive description thereof will be omitted.

Embodiment

A head up display apparatus (HUD apparatus) according to an embodiment of the present invention will be described with reference to FIG. 1 to FIG. 23. The HUD apparatus according to the embodiment is an AR display apparatus having an AR function, and the case where the HUD apparatus is mounted as an in-vehicle AR-HUD will be described. A display control method according to the embodiment is a method including steps executed by the HUD apparatus according to the embodiment.

The HUD apparatus according to the embodiment has a function of correcting a display position of an AR image in a virtual image region when displaying a virtual image including the AR image. This correction function is a function of automatically correcting the display position of the AR image in accordance with the movement of the viewpoint position of the driver so that the shift between the real image of an object and the AR image is eliminated or reduced. In this correction function, when the viewpoint position of a driver moves from the viewpoint position of the basic setting to the left or right position in the horizontal direction, the display position of the AR image is corrected in accordance with the object position and the viewpoint position after movement. Also, in this correction function, the correction of the display position of the AR image is controlled in accordance with the setting of the position of the virtual image region with respect to the viewpoint position and the relationship of the object position with respect to the position of the virtual image region. In this correction function, the correction of the display position of the AR image is realized by the process for correcting the content of the AR data by the software program processing of the controller.

With this correction function, even if the viewpoint position moves in the horizontal direction from the viewpoint position of the basic setting due to the movement of the head of the driver during driving or the like, the AR image can be displayed at a position accurately superimposed on the object. Namely, the shift between the object and the AR image can be eliminated or reduced. Consequently, the driver can visually recognize the object and the AR image suitably.

[Problems, etc.]

Supplementary descriptions for the problems and the like will be given with reference to FIG. 20 to FIG. 23. As a comparative example with respect to the embodiment, the in-vehicle system including the HUD apparatus of the related art has the following problems. The HUD apparatus according to the comparative example does not have the function of correcting the shift between the real image of the object and the AR image. Therefore, when the viewpoint position of the driver moves in the horizontal direction, a shift occurs between the object and the AR image in the horizontal direction, so that it becomes difficult for the driver to perform the visual recognition in which the object and the AR image are associated with each other.

Examples of the case in which the viewpoint position of the driver moves left or right in the horizontal direction include the following cases. The viewpoint position of the driver moves to some extent during driving, and it is impossible that the viewpoint position does not move at any time. If the change of the viewpoint position is within the range of the predetermined eye box, there is little influence of the shift between the object and the AR image. If the change of the viewpoint position exceeds a certain amount, the influence of the shift is large, and it becomes difficult for the driver to perform the visual recognition in which the object and the AR image are associated with each other.

For example, when a vehicle turns right or left, changes lanes, enters an intersection, or the like, the driver tends to move the viewpoint position in order to check the surrounding conditions. In addition, when entering a corner or the like, the head and the viewpoint position are likely to move because the driver leans his/her body in accordance with the corner in advance or due to the effect of centrifugal force. Also, during one-hand driving, the viewpoint position is likely to move because the center of gravity of the body is inclined. Further, in a situation where the visibility is poor at an intersection or the like, the driver sometimes leans forward to check the surrounding situation, so that the viewpoint position is likely to move.

Note that, in the HUD technology, how it looks differs depending on the position of the eyes of a person who views the virtual image region (for example, a driver), for example, the relative positional relationship between the real image and the virtual image is shifted. The state of the image formed on the retina of the viewer is determined by the relationship between the position of the virtual image formed by the HUD apparatus and the position of the eyes of the viewer. When the display position of the virtual image by the HUD apparatus and the position of the eyes of the viewer do not satisfy the predetermined relationship, the viewer cannot or cannot easily recognize the virtual image visually. The range in which the position of the eyes must enter for enabling a viewer to visually recognize the image is referred to as an eye box.

Figure 20:
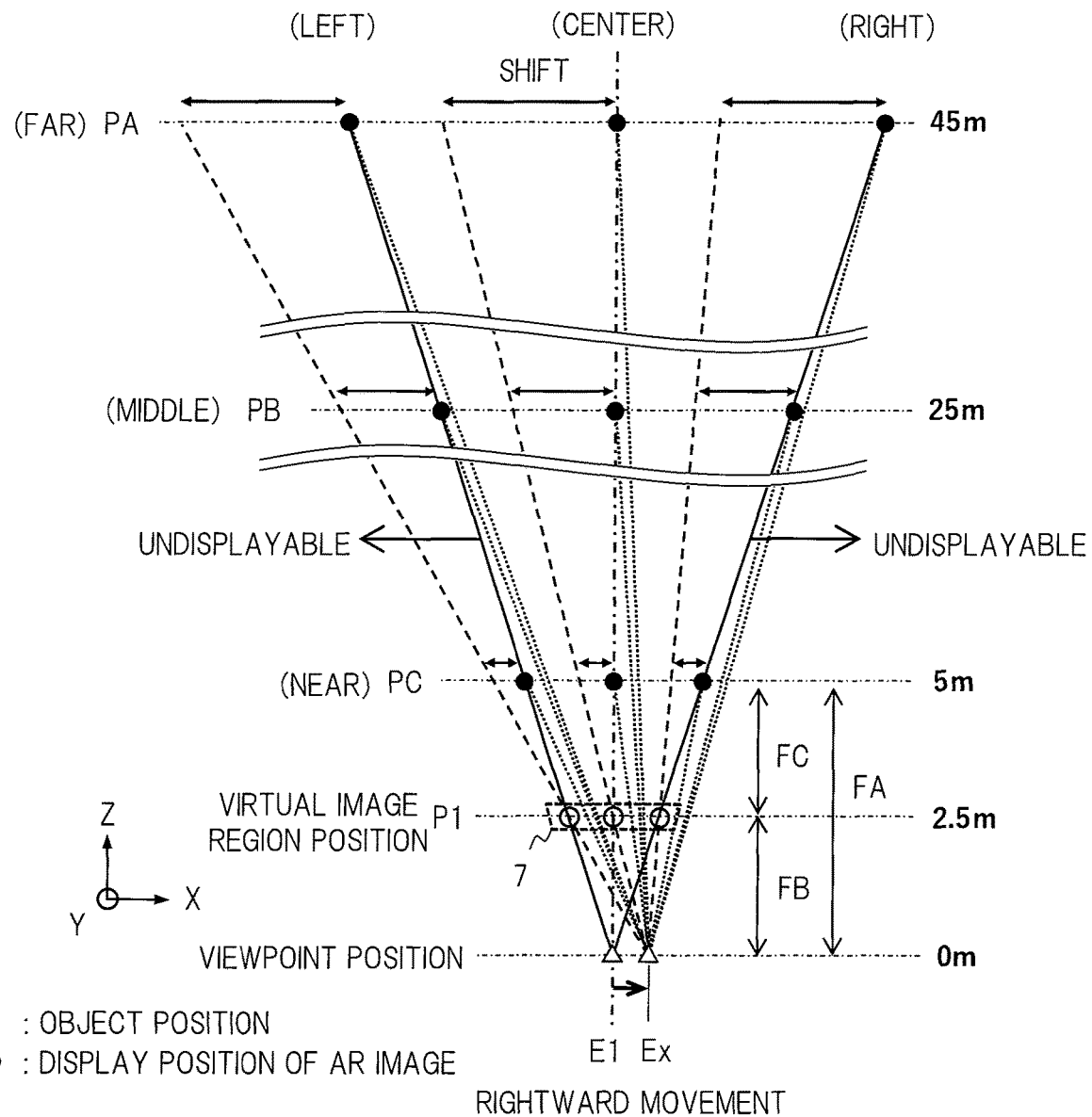
FIG. 20 is a diagram showing a viewpoint, an object, a virtual image, a shift, and the like in the case of a first HUD apparatus according to a comparative example.

FIG. 20 shows a viewpoint, an object, an AR image, a shift, and the like in the case of a first HUD apparatus in a related art example as a first comparative example. FIG. 20 shows a plane (X-Z plane), which is formed by the horizontal direction (X direction) and the front-back direction (Z direction), viewed from above. The viewpoint position of the driver of the own vehicle is denoted by a triangle mark. A viewpoint position E1 of the basic setting and a viewpoint position Ex after movement, for example, when moved to the right in the X direction are shown.

The object position is denoted by a black dot. In this example, the case where the objects are located at three positions having relatively different distances at the back of the virtual image region 7 in the Z direction is shown. The positions are indicated as a long-distance position PA, a middle-distance position PB, and a short-distance position PC. For example, the position PA is located at a position with a distance of about 40 to 60 m, for example, 45 m from the viewpoint position. The position PB is located at a position with a distance of about 20 to 30 m, for example, 25 m from the viewpoint position. The position PC is located at a position with a distance of 5 m from the viewpoint position. The distance from the viewpoint position to the object position (for example, position PC) in the Z direction is indicated as an object distance FA. In this case, at each position in the Z direction, an object is located at each of the left, center, and right positions in the X direction as viewed from the viewpoint position E1.

In the first HUD apparatus, the virtual image region 7 is set at a position with a predetermined distance relatively close in a forward direction (Z direction) from the viewpoint position E1 of the basic setting in design. The position of the virtual image region 7 in the Z direction is defined as a virtual image region position P1. The distance from the viewpoint position (0 m) to the virtual image region 7 is indicated as a virtual image distance FB. In the first HUD apparatus, the virtual image distance FB at the virtual image region position P1 is 2 to 3 m, and is 2.5 m in this example. Also, the distance between the object position (for example, position PC) and the virtual image region position P1 in the Z direction is indicated as an object virtual image distance FC. A display position of the AR image displayed to be superimposed on the object in the virtual image region 7 at the virtual image region position P1, the display position being set in accordance with the object position of each object as viewed from the viewpoint position E1, is denoted by a white dot. A dash-dotted line extending in the Z direction as viewed from the viewpoint position E1 indicates the line of sight for viewing the center of the virtual image region 7 and the center object in the X direction. Each solid line indicates the line of sight for viewing the left object and the right object. When viewing each object and the AR image from the viewpoint position E1, the positions of the object and the AR image overlap on the line of sight, and there is no shift.

As viewed from the viewpoint position Ex after movement, dotted lines indicate the lines of sight for viewing the objects, and broken lines indicate the lines of sight for viewing the AR images. When viewing the object and the AR image from the viewpoint position Ex, the lines of sight for the object and the AR image do not overlap (the angles formed by the lines of sight differ), and there is a position shift in the X direction.

Note that a triangular region including the viewpoint position E1 of the basic setting and the left and right ends of the virtual image region 7 corresponds to a region where the virtual image can be displayed, and the outside thereof basically corresponds to a region where the virtual image cannot be displayed. If the virtual image region position can be adjusted, the displayable region and the non-displayable region also change accordingly.

Figure 21:
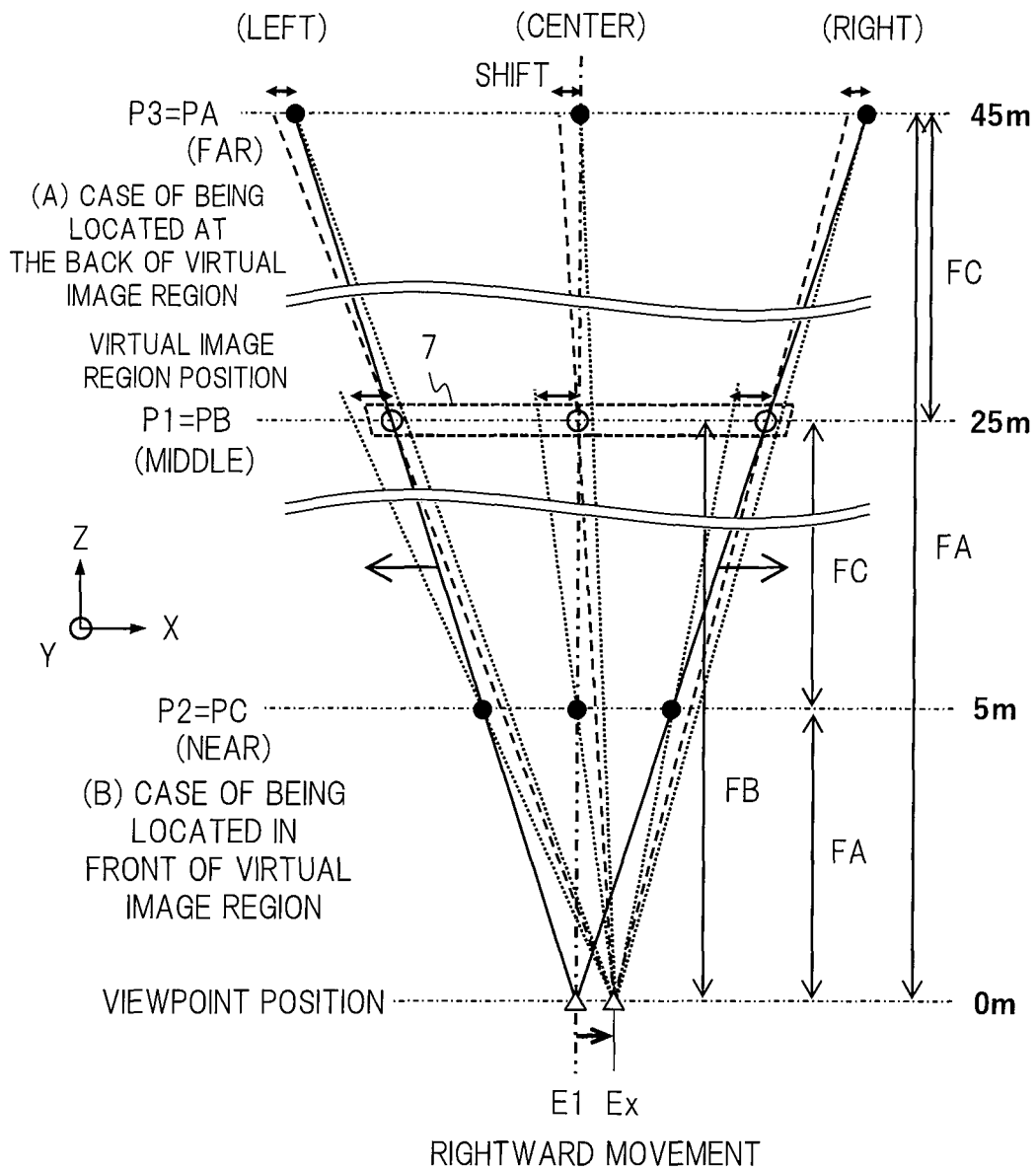
FIG. 21 is a diagram showing a viewpoint, an object, a virtual image, a shift, and the like in the case of a second HUD apparatus according to a comparative example.

FIG. 21 similarly shows a viewpoint, an object, a virtual image, a shift, and the like in the case of a second HUD apparatus as a second comparative example. A HUD apparatus 1 according to the embodiment is based on the second HUD apparatus. In the second HUD apparatus, the virtual image region 7 is set at a position with a predetermined distance relatively far in a forward direction (Z direction) from the viewpoint position E1 of the basic setting in design. The virtual image region position P1 is a position with the virtual image distance FB of 20 to 30 m, and the case where P1=PB=25 m is shown in this example.

As the object position and the object distance FA in the Z direction, a case where objects are each located in front of and at the back of the virtual image region position P1 is shown. A position P3 (particularly defined as a long-distance position PA) indicated as (A) corresponds to the case where the object is located at the back of the virtual image region 7 (virtual image region position P1), and a position P2 (particularly defined as a short-distance position PC) indicated as (B) corresponds to the case where the object is located in front of the virtual image region position P1 of the virtual image region 7. In addition, at each position in the Z direction, an object is located at each of the left, center, and right positions in the X direction as viewed from the viewpoint position E1 in this example. The object at the position P3 has the object virtual image distance FC of +20 m, and the object at the position P2 has the object virtual image distance FC of −20 m.

A display position of the AR image when the AR image is displayed to be superimposed on each object in the virtual image region 7 at the virtual image region position P1 as viewed from the viewpoint position E1 is denoted by a white dot. When viewing the object and the AR image from the viewpoint position E1, the object and the AR image overlap on the line of sight (dash-dotted line, solid line) and there is no shift. When viewing the object and the AR image from the viewpoint position Ex after movement, the line of sight (dotted line) for viewing the object and the line of sight (broken line) for viewing the AR image do not overlap each other and have different angles, and there is a position shift in the X direction.

As in the examples of FIG. 20 and FIG. 21, the position shift occurs between the object and the AR image in visual recognition in accordance with the object position, the object distance, and the viewpoint position after movement. In particular, in the case of the second HUD apparatus, the influence of the shift is relatively larger when the object is in front of the virtual image region 7 as in the position P2 in (B) than when the object is at the back of the virtual image region 7 as in the position P3 in (A). When viewed from the driver, it is more difficult to focus on the object and the AR image and to perform the visual recognition in which the object and the AR image are associated with each other in the case where the object is in front of the virtual image region 7.

FIG. 22 simply shows examples of the shift in accordance with the movement of the viewpoint position in the X direction in the case of the first HUD apparatus. In FIG. 22 and others, the distance in the Z direction is illustrated as being small and the distance in the X direction is illustrated as being emphasized for the sake of explanation. (A) of FIG. 22 shows the case where the viewpoint position moves leftward and the object 4 is located at the center position PB with the middle distance. A viewpoint position E2 after the movement to the left from the viewpoint position E1 is shown. The amount of movement H1 of the viewpoint position is shown. An AR image 6a indicates an AR image in the case of no correction. When viewing the object 4 and the AR image 6a from the viewpoint position E1 of the basic setting, the angle formed by the lines of sight is 0 degrees, and there is no shift in the X direction. When viewing the object 4 and the AR image 6a from the viewpoint position E2 after movement, there is a shift h1 between the two in the X direction (shown as the shift considered at the position PB). An angle α1 indicates an angle formed between the line of sight when viewing the object 4 from the viewpoint position E2 and the Z direction. An angle β1 indicates an angle formed between the line of sight when viewing the AR image 6a from the viewpoint position E2 and the Z direction. The angle α1 and the angle β1 are different from each other (α1<β1).

(B) of FIG. 22 similarly shows the case where the viewpoint position moves rightward and the object 4 is located at the center position PB with the middle distance. A viewpoint position E3 after the movement to the right from the viewpoint position E1 is shown. The amount of movement H2 of the viewpoint position is shown. When viewing the object 4 and the AR image 6a from the viewpoint position E3 after movement, there is a shift h2 between the two. An angle α2 indicates an angle when viewing the object 4 from the viewpoint position E3. An angle β2 indicates an angle when viewing the AR image 6a from the viewpoint position E3. The angle α2 and the angle β2 are different from each other (α2<β2).

As described above, there is the shift in accordance with the moving direction and the amount of movement (moving distance) of the viewpoint position. The angle at the viewpoint position after movement is larger than the angle at the viewpoint position E1, and the larger the angle, the larger the shift.

(C) of FIG. 22 similarly shows the case where the viewpoint position moves leftward and the object position is located at a long-distance position PA and a short-distance position PC. When viewing the object 4a at the position PA and the uncorrected AR image 6a from the viewpoint position E2 after movement, there is a shift h3 between the two. An angle α3 indicates an angle when viewing the object 4a from the viewpoint position E2. An angle β3 indicates an angle when viewing the AR image 6a from the viewpoint position E2. Also, when viewing the object 4c at the position PC and the uncorrected AR image 6a from the viewpoint position E2, there is a shift h4 between the two. Note that the shift h3 and the shift h4 are illustrated as the shifts considered at the position PA for comparison. An angle α4 indicates an angle when viewing the object 4c from the viewpoint position E2. The angle α3 and the angle α4 are different from each other (α3<α4). The angle difference from the angle β3 is larger in the case of the angle α3 at the position PA than in the case of the angle α4 at the position PC, and the shift is also larger in the case of the angle α3 than in the case of the angle α4. As described above, there is the shift in accordance with the object position with each object distance.

(D) of FIG. 22 similarly shows the case where the viewpoint position moves leftward and the object is located at each of the left and right positions in the X direction at the middle-distance position PB. At the position PB, an object 4b1 is located at the position on the left side from the center, and an object 4b2 is located at the position on the right side. When viewing the object 4b1 on the left side and the uncorrected AR image 6a1 from the viewpoint position E2 after movement, there is a shift h5 between the two. Further, when viewing the object 4b2 on the right side and the uncorrected AR image 6a2 from the viewpoint position E2, there is a shift h6 between the two. The angle differs between the case where the object and the AR image are viewed from the viewpoint position E1 of the basic setting and the case where the object and the AR image are viewed from the viewpoint position E2 after movement, and the shift is larger in the latter case. For example, an angle γ1 when viewing the object 4b2 and the AR image 6a2 from the viewpoint position E1, an angle γ2 when viewing the object 4b2 from the viewpoint position E2, and an angle γ3 when viewing the AR image 6a2 from the viewpoint position E2 are shown. γ1 is smaller than γ2, and γ2 is smaller than γ3 (γ1<γ2<γ3). Thus, there is the shift in accordance with the object position in the X direction and the moving direction of the viewpoint.

As described above, when the object 4 and the AR image 6 of the virtual image region 7 are viewed from the viewpoint position of the driver through the visible region 5 of the windshield 9, the angle formed by the line of sight and the like are different between the case where they are viewed from the viewpoint position of the basic setting and the case where they are viewed from the viewpoint position after movement. When viewed from the viewpoint position after movement, the shift in the X direction occurs between the object position and the display position of the AR image 6. As the shift becomes larger, it becomes more difficult for the driver to perform the recognition in which the object 4 and the AR image 6 are associated with each other, and the driver cannot perform the suitable visual recognition.

In (A) of FIG. 22, a position 201 indicates an ideal position where the AR image 6 is desired to be superimposed in the virtual image region 7 in the case of the viewpoint position E2. The position 201 is located at the intersection between the line of the virtual image region 7 in the X direction and the line of sight for viewing the object 4 from the viewpoint position E2. When the AR image 6 is displayed to be superimposed at the position 201, the object 4 and the AR image 6 overlap as viewed from the viewpoint position E2, and the shift is eliminated. Similarly, a position 202 in (B), positions 203 and 204 in (C), and positions 205 and 206 in (D) indicate ideal display positions of the AR image 6.

FIG. 23 shows examples of the shift in accordance with the movement of the viewpoint position in the X direction in the case of the second HUD apparatus. (A) of FIG. 23 shows the case where the viewpoint position moves leftward from the viewpoint position E1. The viewpoint position E2 after movement and the amount of movement H1 are shown. As the object position, a case where the object 4a is located at a position P3 (=PA) at the back of the position PB corresponding to the virtual image region position P1 and a case where the object 4c is located at a position P2 (=PC) in front of the position PB are shown. When viewing the object 4a at the position P3 and the AR image 6a before correction from the viewpoint position E2, there is a shift h11 between the two in the X direction. When viewing the object 4c at the position P2 and the AR image 6a before correction from the viewpoint position E2, there is a shift h12 between the two. Note that the shifts h11 and h12 at the virtual image region position P1 are shown for comparison. An angle cdl indicates the angle when viewing the object 4a at the position P3. An angle α12 indicates the angle when viewing the object 4c at the position P2. An angle β11 indicates the angle when viewing the AR image 6a at the virtual image region position P1. α11 is smaller than α12 (α11<α12), α11 is smaller than β11 (α11<β11), and α12 is larger than β11 (α12>β11). The shift at the position P2 is larger than that at the position P3 (h11<h12).

(B) of FIG. 23 similarly shows the case where the viewpoint position moves rightward. The viewpoint position E3 after movement and the amount of movement H2 are shown. When viewing the object 4a at the position P2 and the AR image 6a before correction from the viewpoint position E3, there is a shift h13 between the two. When viewing the object 4c at the position P2 and the AR image 6a before correction from the viewpoint position E3, there is a shift h14 between the two. The shift at the position P2 is larger than that at the position P3 (h13<h14).

As described above, the shift occurs in accordance with each viewpoint position and each object position. In particular, the influence of the shift is larger in the case where the object 4 is located in front of the virtual image region 7 as in the position P2 than the case where the object 4 is located at the back of the virtual image region 7 as in the position P3.

In (A) of FIG. 23, positions 211 and 212 indicate ideal positions where the AR image 6 is desired to be superimposed in the virtual image region 7. For example, the position 211 is located at the intersection between a line of the virtual image region 7 in the X direction and a line of sight for viewing the object 4a from the viewpoint position E2 (straight line connecting the viewpoint position E2 and the position of the object 4a). When the AR image 6 is displayed to be superimposed on the position 211, the object 4a and the AR image 6 overlap as viewed from the viewpoint position E2, and the shift is eliminated. In the HUD apparatus 1 according to the embodiment, these positions are obtained as display positions of the AR image 6 after correction. Similarly, positions 213 and 214 in (B) indicate ideal display positions of the AR image for the respective object positions and display positions after correction in the embodiment.

As described above, in the first HUD apparatus and the second HUD apparatus, the virtual image region 7 is set at a position (virtual image region position P1) with a predetermined distance (virtual image distance FB) from the viewpoint position E1 in the forward direction (Z direction). The virtual image region 7 is a HUD display range in which a virtual image can be displayed by the HUD apparatus. The virtual image including the AR image is displayed in the virtual image region 7 with the virtual image distance FB at the virtual image region position P1. In the first HUD apparatus, the virtual image region position P1 is a position having the virtual image distance FB of 2 to 3 m and is relatively close to the driver and the windshield 9. On the other hand, in the second HUD apparatus and the HUD apparatus 1 according to the embodiment, the virtual image region position P1 is a position having the virtual image distance FB of 20 to 30 m and is relatively far from the driver and the windshield 9, in other words, the position closer to the object. Further, in the HUD apparatus 1 according to a modification of the embodiment, the virtual image region position P1 in the Z direction can be variably set and controlled within a predetermined setting range (for example, 20 to 30 m).

Therefore, in the second HUD apparatus and the HUD apparatus 1 according to the embodiment, the AR image can be displayed to be superimposed at a distance and position as close as possible to the object as compared with the first HUD apparatus. In other words, the object virtual image distance FC can be made relatively small. When a driver views an object and an AR image associated with the object from a viewpoint position, the sense of perspective and the focus fit more easily as the distance between the object and the AR image becomes closer in the Z direction. Therefore, the driver can easily recognize the object and the AR image and visually recognize the object and the AR image more naturally and suitably.

As described above, the first HUD apparatus and the second HUD apparatus have respective characteristics regarding the shift between the object and the AR image viewed from the viewpoint position. In particular, in the second HUD apparatus, the influence of the shift differs in accordance with the relationship of the object position and the object distance with respect to the virtual image region position P1 in the Z direction. As shown in FIG. 21 and FIG. 23, the influence of the shift is larger when the object is in front of the virtual image region than when the object is at the back of the virtual image region. Even if the object virtual image distance FC is the same in the case where the object is located in front of the virtual image region and the case where the object is located at the back of the virtual image region, the shift is more likely to be perceived visually in the case where the object is located in front of the virtual image region.

In the HUD apparatus 1 according to the embodiment, a function of correcting the display position of the AR image is devised in consideration of the problems of the first HUD apparatus and the second HUD apparatus described above. In this correction function, the display position of the AR image including at least the position in the X direction is appropriately corrected in accordance with the relationship between the object position and the viewpoint position and the relationship between the virtual image region position and the object position.

[Overview]

FIG. 1 shows an overview of the HUD apparatus 1 according to the embodiment. In FIG. 1 and others, the X direction, the Y direction, and the Z direction are defined as directions for explanation. The X direction is a first horizontal direction and a left-right direction based on a vehicle and a driver, and corresponds to a lateral direction of the virtual image region 7. The Y direction is a vertical direction and an up-down direction based on the vehicle and the driver, and corresponds to a longitudinal direction of the virtual image region 7. The Z direction is a second horizontal direction and a front-back direction based on the vehicle and the driver, and corresponds to a direction of viewing the virtual image region 7 and the like.

The HUD apparatus 1 according to the embodiment is a part of an in-vehicle system (FIG. 2) and includes a controller 10 and a display unit 20, and an external camera 2, an internal camera 3, and the like are connected to the HUD apparatus 1. The display unit 20 is configured of a projector (projection image display apparatus) or the like and includes an optical system. The HUD apparatus 1 detects the position and the like of the object 4 located in front of (Z direction) the vehicle based on the image taken by the external camera 2. In addition, the HUD apparatus 1 detects a viewpoint position and the like of the driver based on the image of the driver taken by the internal camera 3. In the HUD apparatus 1, the controller 10 generates AR data for displaying a virtual image including an AR image based on the detected object 4, and provides the display unit 20 with the generated AR data. The AR data is display data for displaying the virtual image by forming the predetermined virtual image region 7 ahead through the visible region 5 of the windshield 9 as viewed from the driver. The display unit 20 generates and emits image light to be projected onto the visible region 5 of the windshield 9 based on the AR data. The emitted image light is projected through the optical system to the region in the visible region 5 of the windshield 9, is reflected in the region, and enters the eyes of the driver. Consequently, the driver visually recognizes the image light as the virtual image including the AR image 6 displayed to be superimposed on the object 4 in the virtual image region 7 seen through the visible region 5.

The controller 10 of the HUD apparatus 1 implements the correction function that is a correction function of a display position of an AR image. In this correction function, the display position of the AR image 6 in the virtual image region 7 is corrected in accordance with the positional relationship among the object position, the viewpoint position, and the virtual image region position. In this correction function, setting information such as the virtual image region position P1 is referred to. In this correction function, based on the display position of the AR image 6a of the viewpoint position E1 of the basic setting, the display position of the AR image 6b after correction as viewed from the viewpoint position Ex after movement is calculated in accordance with the amount of movement of the viewpoint position. In this correction function, the correction is performed so that the display position of the AR image 6b after correction is set at the intersection with the virtual image region 7 on a straight line for viewing the object position from the viewpoint position Ex after movement. In this correction function, the display position of the AR image 6b after correction is obtained by a predetermined conversion process in the controller 10. In this correction function, AR data including information of the display position of the AR image 6b after correction is generated by the process of the controller 10 and is provided to the display unit 20. The display unit 20 projects and displays the AR image 6b of the virtual image region 7 in accordance with the AR data.

In FIG. 1, the virtual image region 7 is set at the virtual image region position P1 with a predetermined distance ahead through the visible region 5 of the windshield 9 as viewed from the viewpoint position E1 of the basic setting of the driver. In this example, a target object 4 on which the AR image 6 is displayed to be superimposed is located at the position P2 in front of the virtual image region 7 in the Z direction. The AR image 6a before correction and the AR image 6b after correction are shown. A position Qa indicates the display position of the AR image 6a before correction in the X direction. A position Qb indicates the display position of the AR image 6b after correction in the X direction.

In the AR function, the AR image 6 is displayed to be superimposed on the real image of the object 4 in the virtual image region 7 as viewed from the viewpoint position E1 of the basic setting. The driver sees the real image of the object 4 and the AR image 6 of the virtual image region 7 ahead through the visible region 5 of the windshield 9 from the viewpoint position E1 or the like. On this premise, if the viewpoint position of the driver moves from the viewpoint position E1 to the left or right position in the horizontal direction (X direction), for example, to the viewpoint position Ex after movement to the right, the shift occurs between the object 4 and the AR image 6a in the state before correction. In other words, a difference and a distance are made between the object position and the AR image display position as viewed from the viewpoint position Ex. As the shift becomes larger, it becomes more difficult for the driver to perform the recognition in which the object and the AR image are associated with each other.

On the other hand, in the HUD apparatus 1 according to the embodiment, the display position (position Qa) of the AR image 6a is corrected to the display position (position Qb) of the AR image 6b in accordance with the object position and the viewpoint position by the correction function. In the state after correction, when the object 4 and the AR image 6b are viewed from the viewpoint position Ex, the position shift is eliminated.

The HUD apparatus 1 detects the position and the distance of the object 4 with respect to the position of the own vehicle and the viewpoint position based on the image of the external camera 2. Further, the HUD apparatus 1 detects the viewpoint position of the driver of the own vehicle and the amount of movement of the viewpoint position based on the image of the internal camera 3. Then, the HUD apparatus 1 controls the correction based on the relationship between the virtual image region position P1 and the object position in the Z direction. The HUD apparatus 1 corrects the display position of the AR image in accordance with the object position, the viewpoint position, and the virtual image region position P1. When displaying and correcting the virtual image, the controller 10 first determines the display position of the AR image 6a from the viewpoint position E1 of the basic setting as a basis. Next, the controller 10 determines by correction the display position of the AR image 6b after correction as viewed from the viewpoint position Ex after movement in accordance with the amount of movement of the viewpoint position.

Note that, in FIG. 1 and others, the viewpoint position E1 and the virtual image region 7 of the basic setting are illustrated as being located at the center in the X direction with respect to the visible region 5 of the windshield 9 for the sake of explanation, but the configuration is not limited to this.

[HUD Apparatus and in-Vehicle System]

Figure 2:
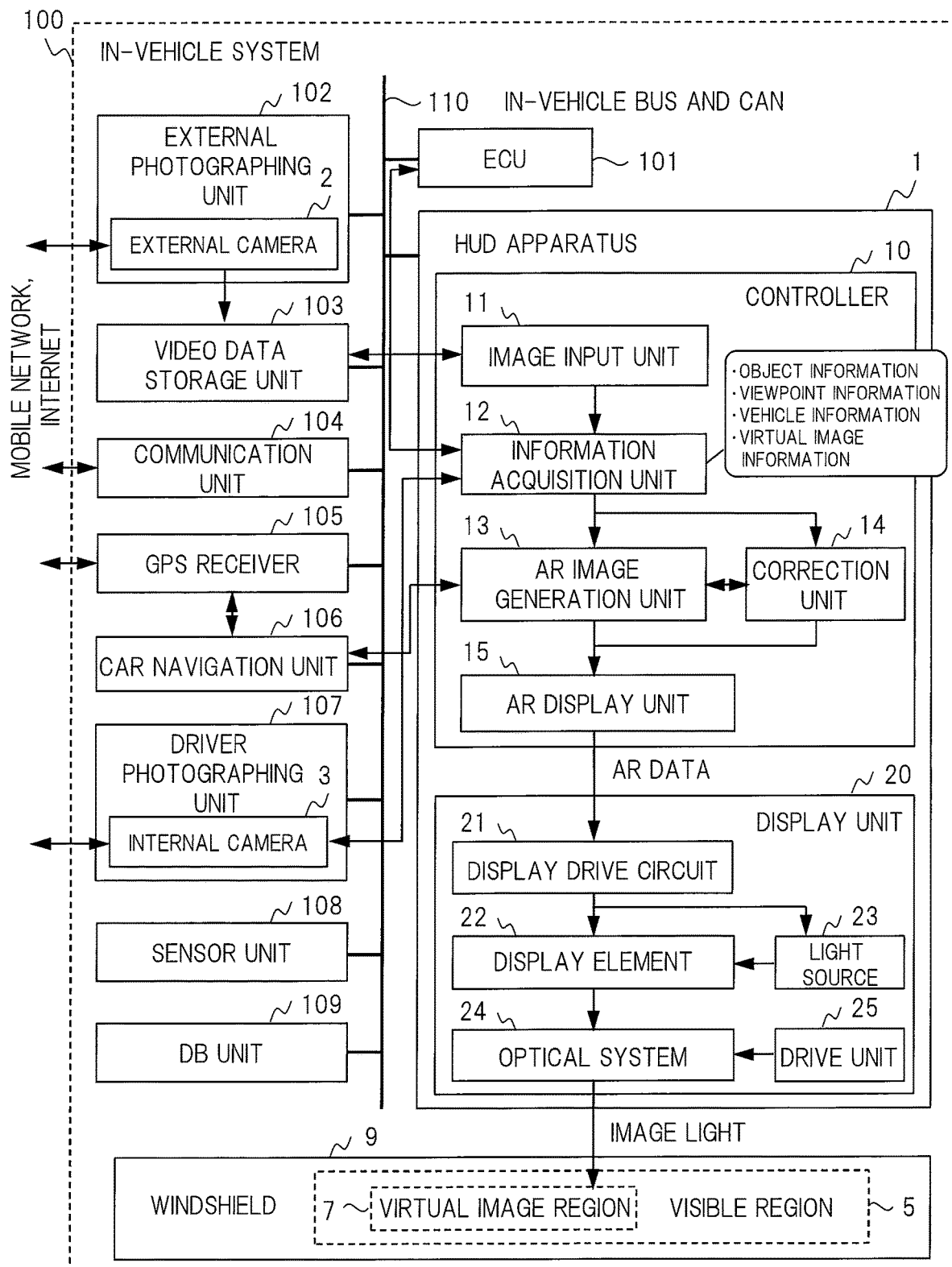
FIG. 2 is a diagram showing a configuration of an in-vehicle system including the HUD apparatus according to the embodiment of the present invention.

FIG. 2 shows a configuration of an in-vehicle system 100 including the HUD apparatus 1 according to the embodiment. The in-vehicle system 100 is a system mounted on an automobile. A driver who is a user operates and uses the in-vehicle system 100 and the HUD apparatus 1. In particular, the HUD apparatus 1 is an AR-HUD apparatus having an AR function.

The in-vehicle system 100 includes an ECU (Engine Control Unit) 101, the HUD apparatus 1, an external photographing unit 102 including the external camera 2, a video data storage unit 103, a communication unit 104, a GPS (Global Positioning System) receiver 105, a car navigation unit 106, a sensor unit 108, a DB unit 109, and the like, and these are connected to an in-vehicle bus and a CAN (Car Area Network) 110. The in-vehicle system 100 further includes an audio output unit, an operation unit, a power supply unit, and the like (not shown).

The HUD apparatus 1 includes the controller 10 and the display unit 20. The HUD apparatus 1 has the AR function. The HUD apparatus 1 can give various types of information to the driver by displaying the virtual image including the AR image in the virtual image region 7 through the visible region 5 of the windshield 9 by using the AR function. The AR function of the HUD apparatus 1 includes a correction function. The correction function is a function of automatically correcting the display position of the AR image in the virtual image region 7.

The HUD apparatus 1 can also provide an audio output such as the guidance or alarm by the car navigation function and the AR function to the driver by using the audio output unit in combination. The HUD apparatus 1 further includes an operation unit such as an operation panel and operation buttons, so that the manual operation input by a driver, for example, turning on/off of the AR function, the user setting, the adjustment of a mirror angle of the optical system 24, and the like are also possible.

The controller 10 controls the entire HUD apparatus 1. The controller 10 includes hardware such as a CPU, a ROM, and a RAM and corresponding software. The controller 10 and other units may be implemented by hardware such as a microcomputer and an FPGA. The controller 10 realizes each unit such as the image input unit 11 by, for example, reading a program from the ROM by the CPU and executing a process in accordance with the program. The controller 10 stores various types of data and information in an internal memory or an external memory as necessary, and performs reading and writing. The controller 10 stores setting information and the like for the AR function in a nonvolatile memory of the memories. The setting information includes setting information for conversion process of the correction unit 14 and user setting information. The user setting information includes the viewpoint position and virtual image region position of the basic setting, the setting information of the mirror angle of the optical system 24, and the like.

The controller 10 receives an input of an image taken by the external camera 2, generates AR data for displaying a virtual image in the virtual image region 7 of the visible region 5 with using the acquired information, and provides the display unit 20 with the AR data. The controller 10 corrects the display position of the AR image in the virtual image region 7 when generating the AR data. In addition, the controller 10 can adjust the state of the optical system 24 such as the mirror angle by controlling the display unit 20. Thus, the position of the virtual image region 7 can be adjusted.

The display unit 20 is configured of a projection image display apparatus (projector) or the like. The display unit 20 includes a display drive circuit 21, a display element 22, a light source 23, the optical system 24, and a drive unit 25, and these are connected to each other. The display unit 20 generates image light for displaying a virtual image based on the control from the controller 10 and the video data (AR data), and projects the generated image light to the region within the visible region 5. The display drive circuit 21 generates a display drive signal for AR display in accordance with the video data from the AR display unit 15 and supplies the display drive signal to the display element 22 and the light source 23 to control the drive of the display element 22 and the light source 23.

The light source 23 generates illumination light for the display element 22 based on the display drive signal. The light source 23 is configured of, for example, a high-pressure mercury lamp, a xenon lamp, an LED element, a laser element, or the like. The light from the light source 23 is incident on the display element 22 through an illumination optical system (not shown). The illumination optical system collects the illumination light, makes it uniform, and irradiates the light to the display element 22.

The display element 22 generates image light based on the display drive signal and the illumination light from the light source 23, and emits the image light to the optical system 24. The display element 22 is configured of, for example, an SLM (Spatial Light Modulator), a DMD (Digital Micromirror Device, registered trademark), a MEMS device, an LCD (Transmissive liquid crystal panel or reflective liquid crystal panel), or the like.

Figure 3:
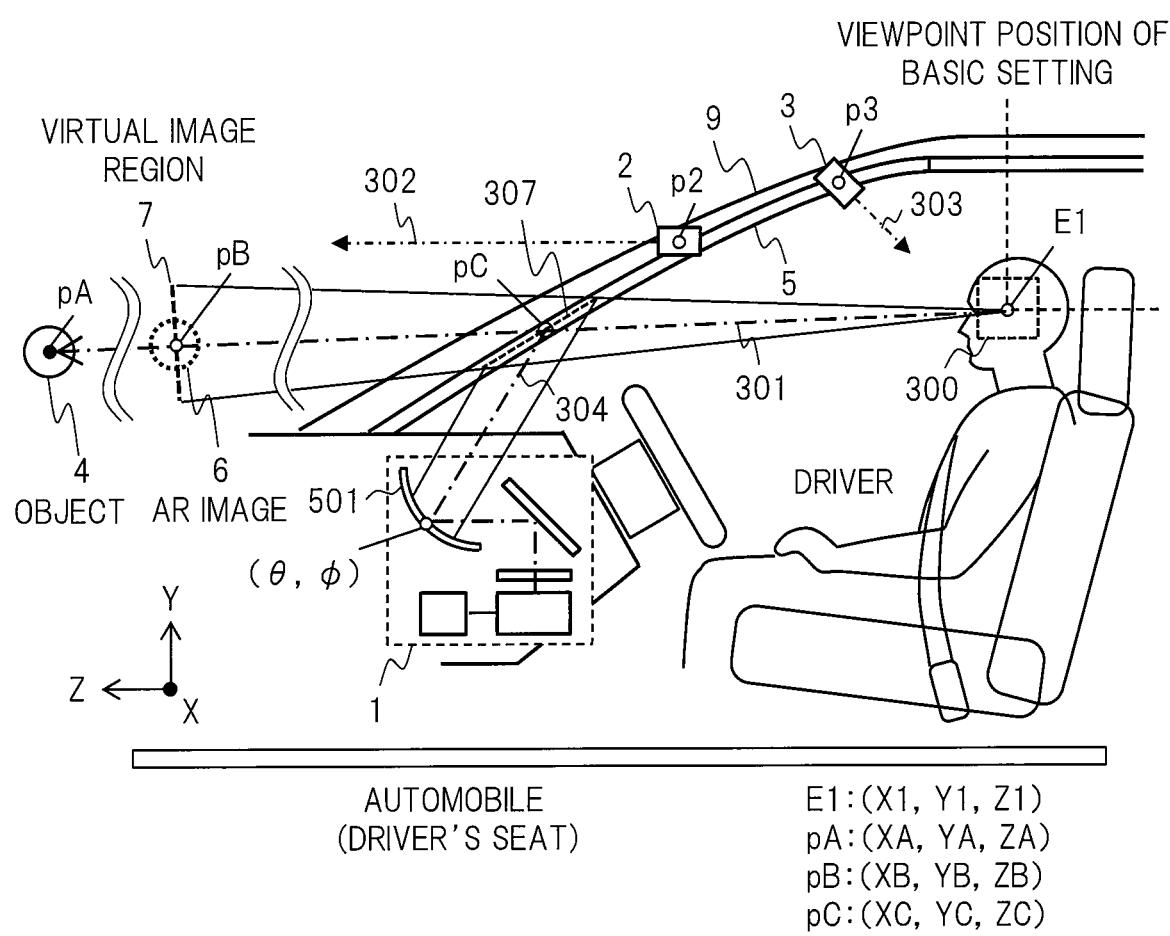
FIG. 3 is a diagram showing a state around a driver's seat of an automobile seen from a side according to the embodiment.

The optical system 24 includes elements such as a lens and a mirror for guiding the image light from the display element 22 to the visible region 5 of the windshield 9. The drive unit 25 is connected to the optical system 24. The image light from the display element 22 is magnified or the like by the lens of the optical system 24, is reflected or the like by the mirror, and is projected to a part of the visible region 5 (FIG. 3). The image light reflected in the region enters the eyes of the driver and forms an image on the retina. Consequently, when viewed from the viewpoint of the driver, the virtual image region 7 that is seen through the visible region 5 is formed so as to correspond to the region within the visible region 5, and a virtual image is visually recognized in the virtual image region 7.

The drive unit 25 is an optical system driver for driving the optical system 24, and includes components such as a motor for driving a lens, a mirror, and the like. The drive unit 25 drives the optical system 24 in accordance with the manual operation input of the driver or the control from the controller 10, thereby changing the angle of the mirror or the like. The drive unit 25 includes an operation button for adjusting the angle of the mirror or the like. The driver can change the angle of the mirror to positive or negative with reference to the standard angle by manual operation of moving the operation button up and down. For example, while a first portion of the operation button is being pressed, the angle of the mirror changes in the positive direction (the direction of increasing the angle), and while a second portion is being pressed, the angle of the mirror changes in the negative direction (the direction of decreasing the angle).

The ECU 101 performs vehicle control including engine control and overall control of the in-vehicle system 100. The ECU 101 is, in other words, a vehicle controller. The ECU 101 may have advanced functions for driving assistance and automatic driving control. In this case, the ECU 101 may control the HUD apparatus 1 by outputting information related to the function to the HUD apparatus 1, thereby causing the HUD apparatus 1 to display a virtual image related to the function. The ECU 101 obtains vehicle information such as a vehicle speed based on the detection information from the sensor unit 108 and uses it for control. Further, the HUD apparatus 1 can acquire vehicle information from the ECU 101 and use it for control.

The external photographing unit 102 includes one or more external cameras 2, and captures a situation including the front of the own vehicle by using the external camera 2 when the own vehicle is stopped or running, thereby acquiring video data (including time-series image frames) and vehicle surrounding information. The external photographing unit 102 stores the video data and the like in the video data storage unit 103 or outputs the video data and the like to the ECU 101 and the HUD apparatus 1.

The external camera 2 is installed at a predetermined position of the vehicle so as to have a predetermined direction and an angle of view (FIG. 3). The position of the external camera 2 is, for example, near the front bumper of the vehicle, near the side of the windshield 9, or near the rearview mirror at the side of the vehicle. The external camera 2 takes an image in a predetermined shooting direction and in a range of a predetermined angle of view so as to include the front of the vehicle and the driver, and outputs video data.

The external photographing unit 102 may or may not include a signal processor that processes the image of the external camera 2. The signal processor may be provided in the ECU 101 or the HUD apparatus 1. The signal processor may process the images of one or more external cameras 2 and obtain the vehicle surrounding information and the like by calculation. The external photographing unit 102 may determine the situation such as another vehicle, a person, a building, a road surface, terrain, weather, and the like around the own vehicle based on the analysis of the image of the external camera 2.

The external photographing unit 102 may have a function of measuring the distance between the own vehicle and the object (object distance) and the position of the object in space relative to the own vehicle (object position) based on the image of the external camera 2. When two or more cameras or a stereo camera are provided as the external camera 2, the object distance can be calculated by a known distance measurement method based on binocular disparity by using two images taken by the two left and right cameras. Further, even when only one external camera 2 is provided, the object position in space, the object distance, and the like can be schematically calculated by a predetermined calculation based on the object position in the image of the external camera 2, the detection information of other sensors, and the like.

The video data storage unit 103 stores video data and the like from the external camera 2. The video data storage unit 103 may be provided inside the external photographing unit 102 or inside the HUD apparatus 1. Further, the video data storage unit 103 may store the video data of the internal camera 3 of a driver photographing unit 107 and the like.

The communication unit 104 includes a communication interface device that performs communication with a mobile network outside the vehicle, the Internet, and the like. The communication unit 104 can communicate with, for example, a server or the like on the Internet based on the control from the ECU 101, the HUD apparatus 1, and the like. For example, the HUD apparatus 1 may refer to and acquire original data and related information to be used for AR display from the server via the communication unit 104. The communication unit 104 may include a vehicle-to-vehicle communication wireless receiver, a road-to-vehicle communication wireless receiver, a VICS (Vehicle Information and Communication System) receiver, and the like. The vehicle-to-vehicle communication is the communication between the own vehicle and other vehicles around the own vehicle. The road-to-vehicle communication is the communication between the own vehicle and roads and devices such as traffic lights around the own vehicle.

The GPS receiver 105 acquires current position information (for example, latitude, longitude, altitude, and the like) of the own vehicle based on signals from GPS satellites. The ECU 101, the HUD apparatus 1, and the car navigation unit 106 can acquire the current position information of the own vehicle from the GPS receiver 105 and use it for control.

The car navigation unit 106 is a part of an existing car navigation system mounted on a vehicle, and is configured to hold map information, position information acquired from the GPS receiver 105, and the like and perform the known navigation process by using the information. The ECU 101 and the HUD apparatus 1 can perform control by acquiring the information from the car navigation unit 106. The HUD apparatus 1 may refer to the information from the car navigation unit 106 and use it as original data for AR display. For example, the HUD apparatus 1 may generate an arrow image for the navigation of a traveling direction to a destination as an example of the AR image based on the original data.

The sensor unit 108 has a group of known sensors mounted on the vehicle, and outputs detection information. The ECU 101 and the HUD apparatus 1 perform control by acquiring the detection information. Examples of sensor devices in the sensor unit 108 include a vehicle speedometer, an acceleration sensor, a gyro sensor, a geomagnetic sensor (electronic compass), an engine start sensor, a shift position sensor, a steering wheel angle sensor, a headlight sensor, an external light sensor (chromaticity sensor and illuminance sensor), an infrared sensor (proximity object sensor), a temperature sensor, and the like. The acceleration sensor and the gyro sensor detect acceleration, angular velocity, angle, and the like as the state of the own vehicle.

The sensor unit 108 may include a distance sensor that measures the distance between the own vehicle and the object. The distance sensor can be realized by, for example, an optical sensor, and can calculate the distance based on the time until the emitted light hits the object and returns. When the distance sensor is provided, object distance information can be acquired from the distance sensor.

The DB unit 109 is configured of a storage or the like, and the DB stores original data and information that can be used for AR display. Examples of the original data include basic image data for generating an AR image and the like. Examples of information include basic information and related information of a target object, a reference image, and the like. The DB unit 109 may be provided inside the HUD apparatus 1, may be combined with the car navigation unit 106, or may be provided in a data center or the like on the communication network outside the in-vehicle system 100. Information acquired from the outside via the communication unit 104 may be stored in the DB.

The windshield 9 is a part of an automobile, and is configured of glass having transparency and rigidity, a film having predetermined optical characteristics, and the like (FIG. 3). The virtual image region 7 is formed in a part of the visible region 5 of the windshield 9 when the AR function is used. Note that a dedicated AR display panel (combiner or the like) may be provided in front of the windshield 9. The virtual image region 7 can be set within the range of the visible region 5.

The image input unit 11 receives an input of an image taken by the external camera 2 and extracts a predetermined object for AR from the image. An information acquisition unit 12 acquires object information, viewpoint information, vehicle information, virtual image information, and the like as information necessary for AR display, correction, and the like. The object information is information including an object position and an object distance. The object position is two-dimensional coordinates in an image, three-dimensional coordinates in space, or the like. The object distance is a distance between the own vehicle and the object. The vehicle information is information including a vehicle speed, a traveling direction, and the like. The viewpoint information is information such as a viewpoint position of the driver. The virtual image information is information such as a set position of the virtual image region 7 and the like.

An AR image generation unit 13 generates basic AR image data displayed to be superimposed on an object. The basic AR image has a basic display position in the virtual image region 7. The correction unit 14 is, in other words, a display position conversion unit, and performs a correction process of the display position of the AR image in accordance with the correction function. The correction unit 14 corrects the display position of the AR image in the virtual image region 7 by using the basic AR image generated by the AR image generation unit 13 and each information acquired by the information acquisition unit 12. The correction unit 14 performs the correction as a predetermined conversion process. The conversion process is defined in advance in, for example, a conversion table. The correction unit 14 outputs data including the display position of the AR image after correction. The AR display unit 15 generates AR data for displaying and superimposing the virtual image including the AR image on the virtual image region 7 by using the data after correction, and performs display control of the display unit 20 based on the AR data.

[Driver's Seat]

FIG. 3 shows an overview of the viewpoint position, the virtual image region position, and the like in a plane in which a driver's seat of an automobile is seen from a side (X direction). The state in FIG. 3 shows the basic setting state, in which the driver sees the AR image 6 in the virtual image region 7 and the object 4 that can be seen through the visible region 5 of the windshield 9 from the viewpoint position E1 of the basic setting. The windshield 9 is present in front of the driver's seat and the visible region 5 is present as apart of the windshield 9, and the virtual image region 7 is formed so as to correspond to a partial region 307 in the visible region 5. The HUD apparatus 1, the car navigation unit 106, and the like are accommodated and installed at a position of a dashboard in front of the driver's seat, for example, at a position of a console panel.

The viewpoint position E1 of the basic setting based on the position of the eyes of the driver is shown. Also, an eye box 300 including the viewpoint position E1 is shown. Note that the viewpoint position may be different from the eye position. For example, the viewpoint position may be calculated as an intermediate point between the left and right eyes, or may be calculated as a center point of a head or a face. In addition, the line of sight 301 when viewing the AR image 6 in the virtual image region 7 and the object 4 from the viewpoint position E1 through the region 307 in the visible region 5 is indicated by a dash-dotted line.

Examples of an installation position p2 of the external camera 2 in a vehicle and a shooting direction 302 are shown. In this case, the shooting direction 302 is the Z direction. Examples of an installation position p3 of the internal camera 3 in a vehicle and a shooting direction 303 are shown. Installation positions of the external camera 2 and the internal camera 3 are not limited to these and any installation positions are possible.

Figure 5:
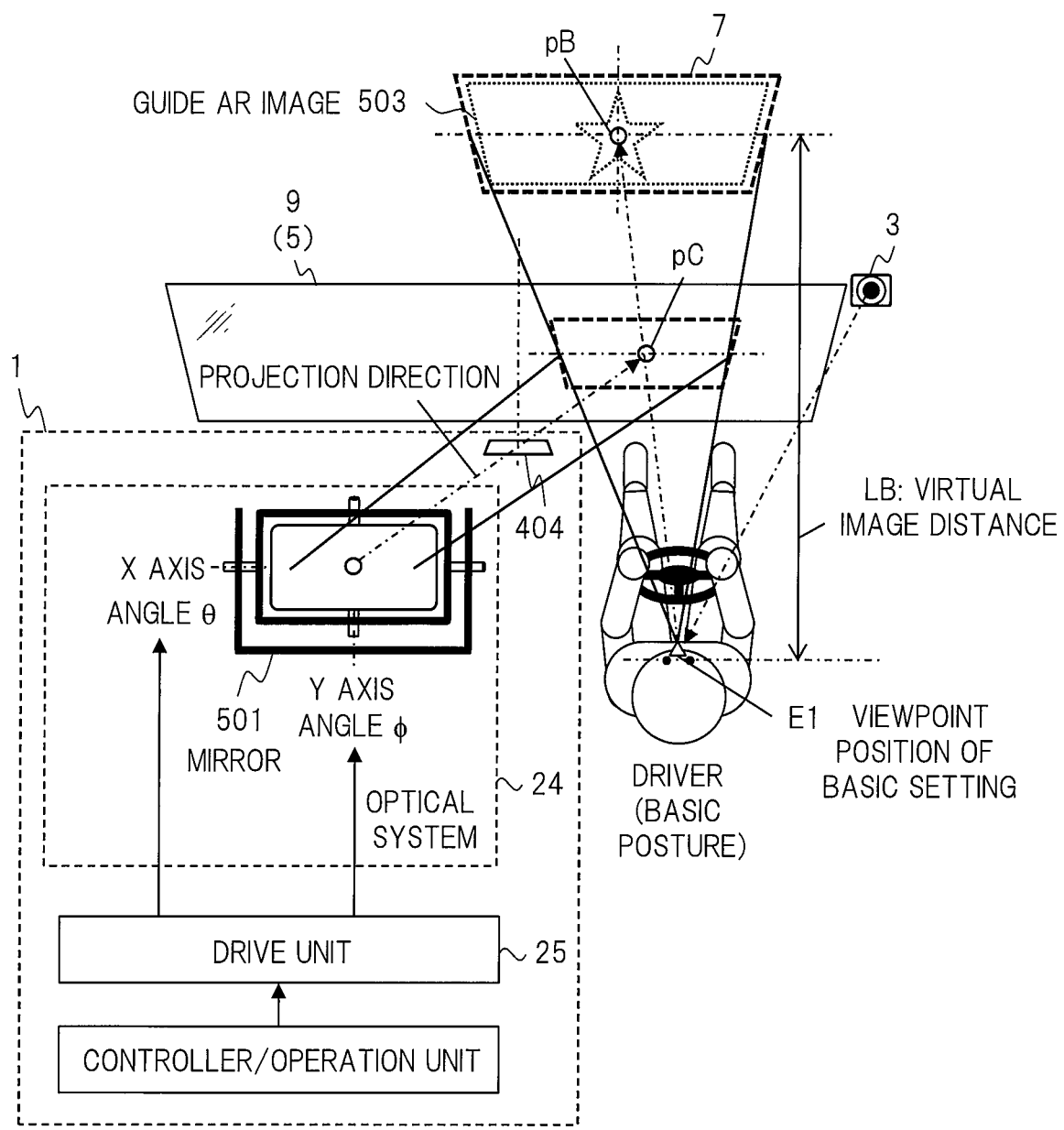
FIG. 5 is a diagram showing a basic setting of a viewpoint position and a virtual image region according to the embodiment.

FIG. 3 shows a mirror 501 in the optical system 24 in the HUD apparatus 1. The mirror 501 has an angle θ and an angle φ as biaxial variable angles (FIG. 5). The image light 304 reflected by the mirror 501 is projected to the region 307 in the visible region 5 inside the windshield 9 and is reflected toward the eyes of the driver. A center position pC of the region 307 corresponds to the projection position of the image light 304. Note that the configuration of the optical system 24 is not limited to this, and any configuration is possible as long as the position and direction in which the image light is projected to the visible region 5 are variable.

The AR image 6 in the virtual image region 7 is formed at a forward position through the visible region 5 so as to correspond to a position pA of the object 4 in space as viewed from the viewpoint position E1 on the calculation of the HUD apparatus 1. The center point of the virtual image region 7 in space and the display position of the AR image 6 when displayed at the center point are indicated as a position pB. The line of sight 301 passes through the position pC, the position pB, and the position pA, and the real image of the object 4 and the AR image 6 superimposed thereon are viewed along the line of sight 301. In this case, the virtual image region 7 is shown as a plane having a sight line direction 301 as a normal line.

The mirror 501 is a free-form mirror or the like, for example, a concave mirror. The mirror 501 has an angle θ and an angle φ indicating the orientation. The mirror 501 has, for example, the angle θ of a rotation axis (X axis) extending in the X direction and the angle φ of a rotation axis (Y axis) extending in the Y direction. The angle θ and the angle φ of the mirror 501 can be varied within a predetermined range by the driving from the drive unit 25. The projection direction and the projection position (position pC) of the image light 304 can be varied in accordance with the state of the angle θ and the angle φ. Further, a function of distortion correction for adapting to the region 307 having a curved surface can also be provided by the design of the curved surface of the mirror 501 or the like.

Each position such as the viewpoint position has three-dimensional coordinates in space. For example, the viewpoint position E1 has (X1, Y1, Z1), the position pA has (XA, YA, ZA), the position pB has (XB, YB, ZB), and the position pC has (XC, YC, ZC). The controller 10 obtains the three-dimensional coordinates of each position by calculation.

The relationship among the position p2 of the external camera 2, the position p3 of the internal camera 3, and the viewpoint position is as follows. In the in-vehicle system 100 and the HUD apparatus 1, the position p2 of the external camera 2 and the position p3 of the internal camera 3 in space are set in advance. Further, the viewpoint position of the driver generally falls within a predetermined range corresponding to the vicinity of the driver's seat, and is obtained by the driver photographing unit 107. Although the three-dimensional coordinates of each position are different, the position p2, the position p3, and the viewpoint position (for example, the viewpoint position E1) have a predetermined relationship. These positions can be mutually converted by calculation based on the predetermined relationship, and can be aligned at the time of calculation such as the correction. In addition, the position of the own vehicle has a relationship with these positions, and can be mutually converted similarly. For example, the object position and the object distance viewed from the viewpoint position can be calculated from the object position and the object distance viewed from the position p2 of the external camera 2 and the distance between the position p2 and the viewpoint position E1. Further, as a modification, it is also possible to perform the control while omitting the calculation of the mutual conversion among the positions and considering each of the positions as substantially the same position, and a commensurate effect can be obtained.

[Windshield]

Figure 4:
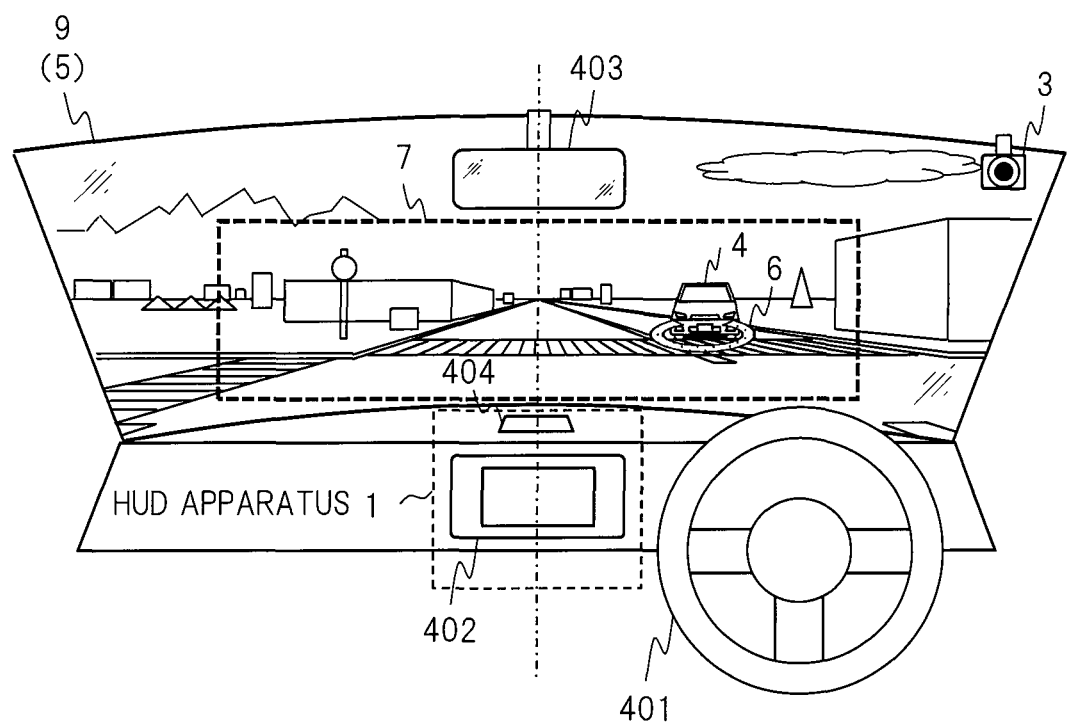
FIG. 4 is a diagram schematically showing a state where a visible region and a virtual image region of a front windshield are seen from a driver's seat according to the embodiment.

FIG. 4 simply shows the visible region 5 of the windshield 9 and the virtual image region 7 viewed from a front seat of a vehicle. FIG. 4 shows a state where there is no shift between the real image and the virtual image (AR image). A steering wheel 401 and the like are provided on the right side, and a console panel 402 and the like are provided near the center of the dashboard, in which the HUD apparatus 1, the car navigation unit 106, and the like are accommodated. On the console panel 402, operation input and screen display of the HUD apparatus 1 and the car navigation unit 106 are performed. The windshield 9 has the visible region 5 with a curved surface. On an upper side of the windshield 9, an internal rearview mirror 403 and the like are installed. In this example, the internal camera 3 is installed at the upper right position of the windshield 9. Although not shown, the external camera 2 is installed at any given position of the vehicle.

In an example of the real image in FIG. 4, another vehicle (oncoming vehicle) is present as the target object 4 on the road in front of the own vehicle, near the intersection. The image light is projected through an opening 404 of the HUD apparatus 1 to a region in the visible region 5 of the windshield 9, so that the virtual image region 7 (indicated by a broken line frame and not displayed in actual) viewed from the driver is formed. The AR image 6 is displayed to be superimposed on the object 4 in the virtual image region 7. In this example, the AR image 6 is an alert icon image for alerting the driver about the oncoming vehicle, and has an arch shape (ring shape having a notch).

[Basic Setting]

FIG. 5 shows the basic setting and the like of the viewpoint position E1 and the virtual image region 7 in accordance with the individual driver. The viewpoint position E1 of the basic setting is shown. The viewpoint position E1 is set as a user setting value based on the initial setting value of the HUD apparatus 1. The driver adjusts the driver's seat and the like in accordance with his or her physical size and posture, and takes a basic posture. Thereafter, the driver performs the basic setting of the virtual image region 7 and the viewpoint position E1 of the HUD apparatus 1. The driver sets the virtual image region 7 to be in a suitable state as viewed from the viewpoint of the driver by adjusting the angles θ, φ, and the like of the mirror 501 of the optical system 24 as necessary. The position of the virtual image region 7 can be changed in the X direction and the Y direction within a predetermined setting range. In a modification, the position of the virtual image region 7 can be further changed in the Z direction within a predetermined setting range.

At the time of the basic setting, the HUD apparatus 1 displays a guide AR image 503 (for example, a frame indicating the virtual image region 7 or a mark indicating the center position) for the basic setting in the virtual image region 7. For example, the driver adjusts the angle of the mirror 501 and the like manually while watching the guide AR image 503 so as to be in a suitable state in accordance with the line of sight from his or her own viewpoint position.

The HUD apparatus 1 has the mirror 501 as a part of the optical system 24. The HUD apparatus 1 has the drive unit 25 that variably drives the angles θ and φ of the mirror 501. The drive unit 25 changes the angles θ and φ of the mirror 501 by driving a motor or the like based on the control from the controller 10 or the operation input from the operation unit (for example, operation buttons of the console panel 402). The projection direction and the projection position (position pC) are determined in accordance with the angles θ and φ of the mirror 501. By adjusting the angle θ, the position of the virtual image region 7 in the Y direction as viewed from the driver can be adjusted. In addition, by adjusting the angle φ, the position of the virtual image region 7 in the X direction as viewed from the driver can be adjusted. In the example of FIG. 5, the case where the virtual image region 7 is adjusted to a position on the right side within the windshield 9 by adjusting the angle φ is shown.

At the time of the basic setting, the HUD apparatus 1 photographs the driver with the internal camera 3, detects a viewpoint position based on, for example, an intermediate point of both eyes, and sets it as the viewpoint position E1 of the basic setting. Further, the HUD apparatus 1 detects and sets the angles θ and φ of the mirror 501 in the state corresponding to the viewpoint position E1 via the drive unit 502. Note that the HUD apparatus 1 may automatically perform the basic setting by adjusting the angle of the mirror 501 while omitting the adjustment operation by the driver.

Further, in the HUD apparatus 1 according to a modification of the embodiment, the position and the like of the virtual image region 7 in the front-back direction (Z direction) can be variably set and controlled. Whether or not the display position of the AR image is corrected and the correction method can be set depending on the position of the virtual image region. As one of the setting information of the controller 10, there are a virtual image region position and a virtual image distance. The HUD apparatus 1 can change the virtual image distance in accordance with the use or situation or in accordance with the user setting, and can set the virtual image region 7 at the position of the virtual image distance. For example, there are virtual image distances suitable for the traveling on a general road and the traveling on an expressway. The controller 10 of the HUD apparatus 1 can switch and set the virtual image distance in accordance with the determination of these situations (for example, the determination based on the vehicle speed). Further, the virtual image distance can be changed in accordance with an arbitrary input operation by the driver.

[Setting Example in Virtual Image Region]

Figure 6:
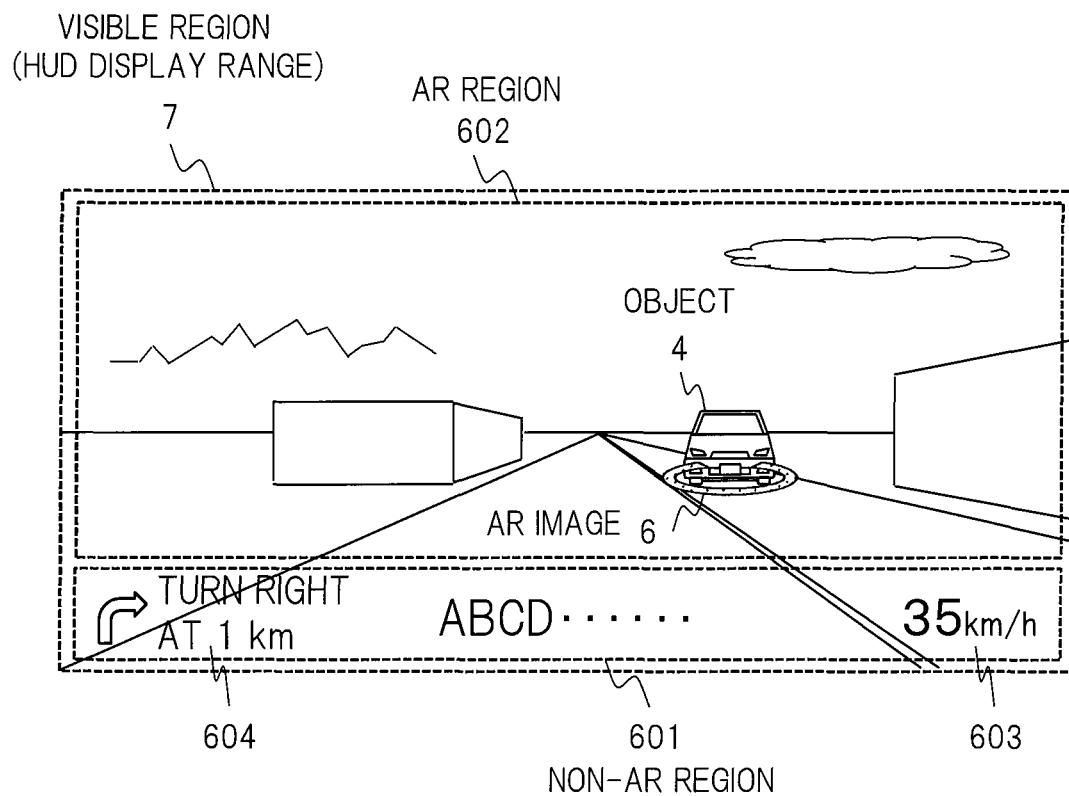
FIG. 6 is a diagram showing a setting example in the virtual image region according to the embodiment.

FIG. 6 shows a setting example in the virtual image region 7 (HUD display range). Various virtual images can be displayed in the virtual image region 7 in accordance with the setting. In the virtual image region 7, the display position and the display region can be set for each information type. In this example, a non-AR region 601 which is a lower side region and an AR region 602 which is a region other than the non-AR region 601 are set in the virtual image region 7. In the non-AR region 601, vehicle information and the like are displayed as a virtual image (non-AR image). Examples of the vehicle information include vehicle speed information 603, navigation information 604 such as right/left turn and destination distance, and other information (arbitrary characters and the like). The virtual image of the non-AR region 601 is not set as a target object to which the correction function is applied.

In the AR region 602, the AR image 6 (for example, an alert icon image) is displayed to be superimposed on the target object 4, and is basically set as a target object to which the correction function is applied. There are various types of AR images 6 to be displayed in the AR region 602. For each type of the object 4, the type of the AR image 6, whether or not the correction function is applied, and the like can be set. A table on the lower side of FIG. 6 shows an example of AR setting when displaying an AR image in the AR region 602 of the virtual image region 7 by the AR function and the correction function. In this table, information items include an object type, an AR image type, application or non-application of the correction function, and the like. The AR image type, the application or non-application of correction, and the like can be set for each object type. As a setting example, the setting in which, when the target object is a car corresponding to the object type K1, the AR image type G1 is applied and the correction of the AR image display position by the correction function is applied is shown.

[Relationship Between Position and Distance]

Figure 7:
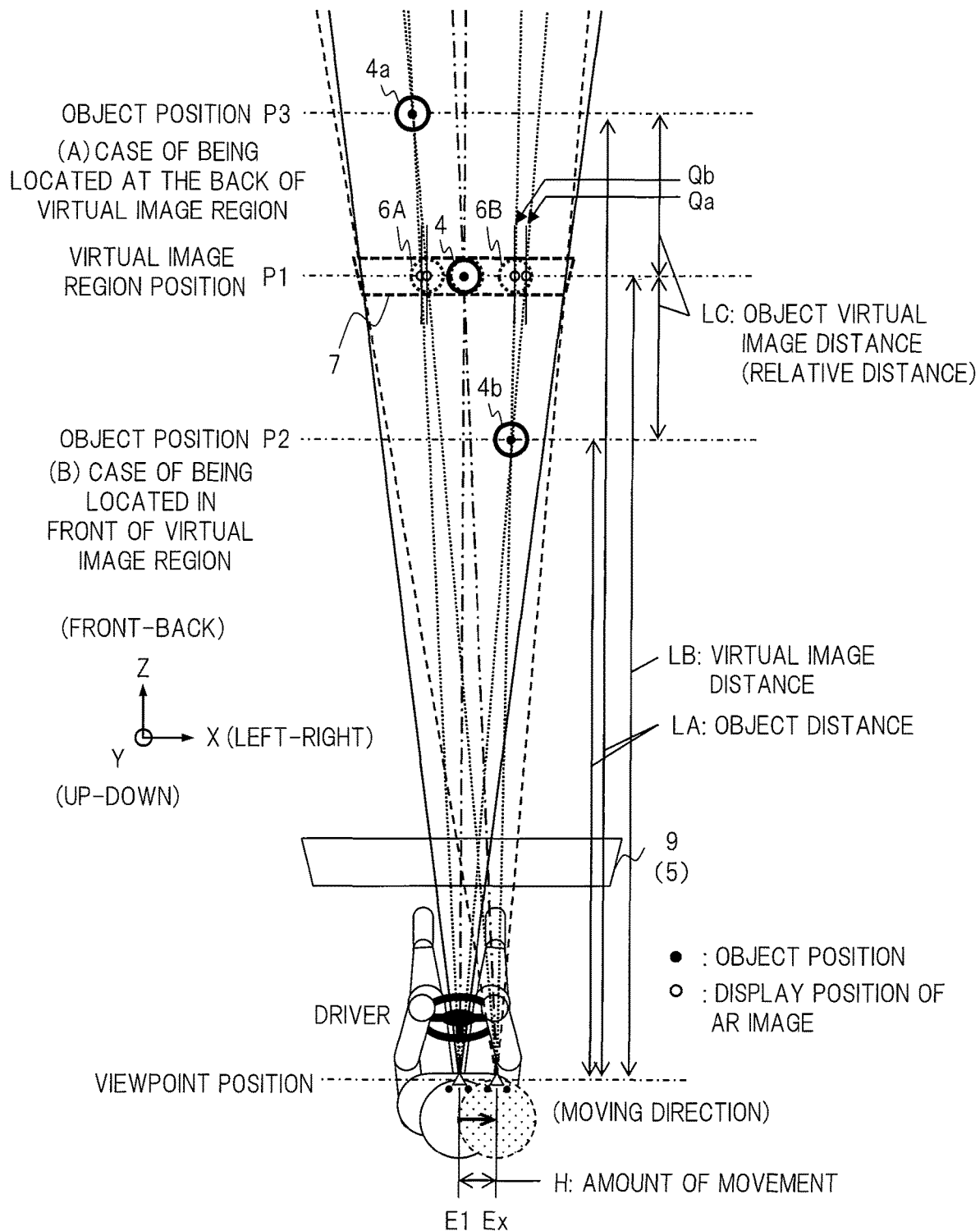
FIG. 7 is a diagram showing a relationship between a position and a distance of a viewpoint, an object, and a virtual image according to the embodiment.

FIG. 7 shows the relationship between the position and the distance of the viewpoint, the object, and the virtual image (virtual image region 7). The viewpoint position E1 of the basic setting and the viewpoint position Ex after movement to the right in the X direction are shown. The amount of movement H (viewpoint moving distance) from the viewpoint position E1 to the viewpoint position Ex is shown. As the object positions, the position P2 (particularly on the right side in the X direction) in the case of the object 4b located in front of the virtual image region position P1 of the virtual image region 7 in the Z direction and the position P3 (particularly on the left side in the X direction) in the case of the object 4a located at the back of the virtual image region position P1 of the virtual image region 7 in the Z direction are shown. The object 4 is denoted by a solid circle. The AR image 6 is denoted by a dotted circle. The distance from the viewpoint position to the object position (for example, position P2 or position P3) is indicated as an object distance LA. The distance between the viewpoint position and the virtual image region position P1 is indicated as a virtual image distance LB. The distance between the virtual image region position P1 and the object position is indicated as a virtual image object distance LC (relative distance).

The virtual image region 7 is set at the virtual image region position P1 with the predetermined virtual image distance LB from the viewpoint position E1 in the forward direction (Z direction) through the windshield 9. The virtual image distance LB is set by the HUD apparatus 1 and is variable in the case of a modification. The virtual image distance LB is 20 to 30 m (for example, 25 m) as in the above-described second HUD apparatus. When the object 4 is at the virtual image region position P1, the display position of the AR image 6 is the same as the position of the object 4.

The display position of the AR image 6 of each object 4 in the X direction within the virtual image region 7 is denoted by a white dot. For example, in the case of the object 4a at the object position P3, the AR image 6A after correction viewed from the viewpoint position Ex after movement is shown based on the AR image 6 before correction viewed from the viewpoint position E1. In the case of the object 4b at the object position P2, the AR image 6B after correction viewed from the viewpoint position Ex after movement is shown based on the AR image 6 before correction viewed from the viewpoint position E1. For example, with respect to the object 4b, the position Qa of the AR image before correction and the position Qb of the AR image 6B after correction are shown.

In the correction function, the HUD apparatus 1 corrects the display position of the AR image 6 in accordance with the relationship between the position and the distance of the viewpoint, the object, and the virtual image region 7 as described above. In particular, the effect of the position shift differs between the case where the object 4 is located in front of the virtual image region 7 and the case where the object 4 is located at the back of the virtual image region 7. Therefore, for example, the HUD apparatus 1 corrects the display position of the AR image 6 when the object 4 is located in front of the virtual image region 7.

[Process Flow]

Figure 8:
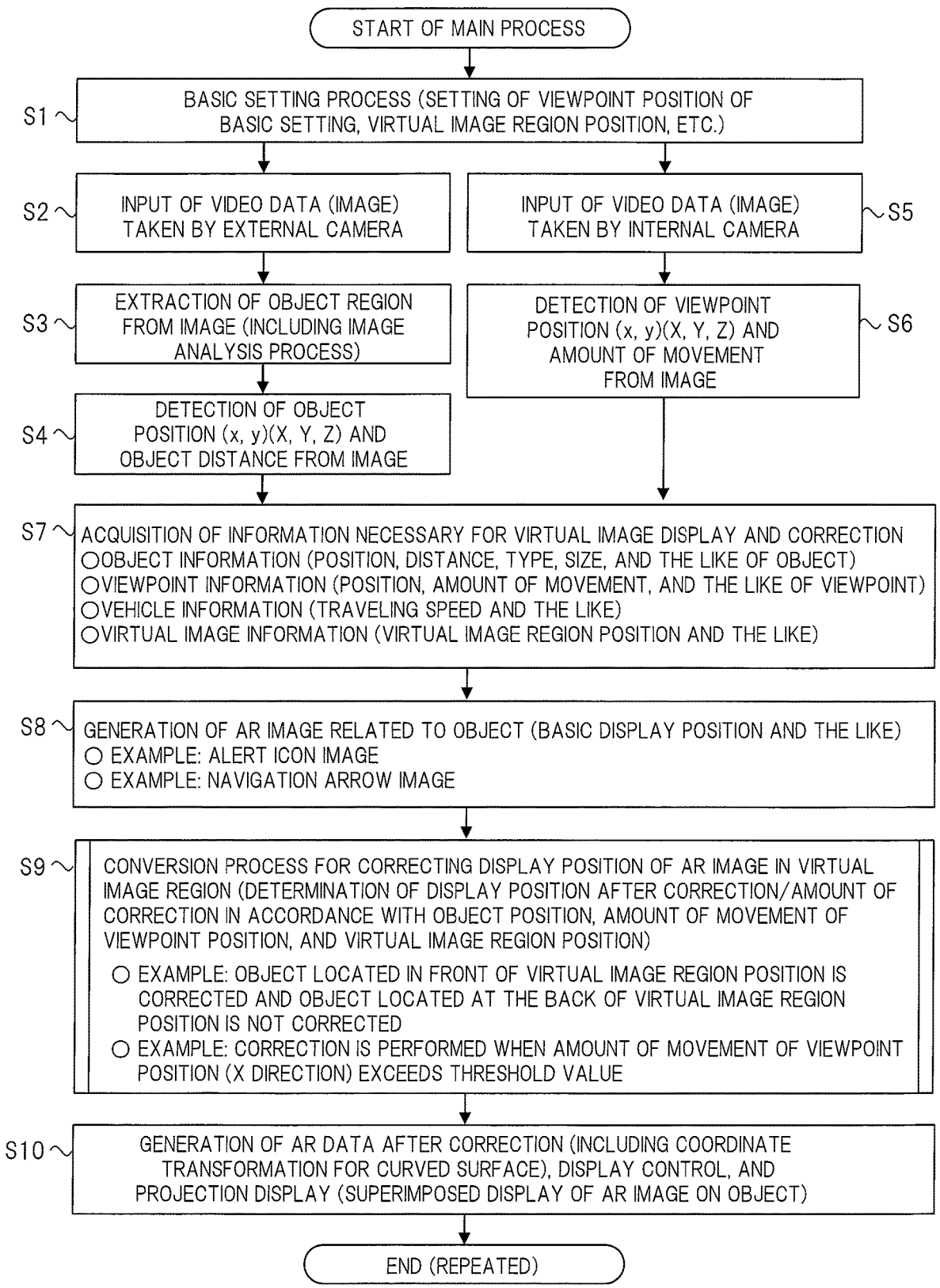
FIG. 8 is a diagram showing a flow of a main process of a controller according to the embodiment.

FIG. 8 shows a main process flow of the controller 10 of the HUD apparatus 1. This process includes the conversion process for the correction of the display position of the AR image. The controller 10 performs such process in real time while the own vehicle is running and the AR function is being used. FIG. 8 includes steps S1 to S10. Hereinafter, the steps will be described in order.

(S1) The HUD apparatus 1 performs a basic setting process based on the operation of the driver. As shown in FIG. 5, the viewpoint position E1, the virtual image region position P1, and the like of the basic settings are set. The HUD apparatus 1 performs the following process while the AR function is on.

(S2) The image input unit 11 of the controller 10 sequentially receives an input of the image frame of the video data of the external camera 2 of the external photographing unit 102 by, for example, reading it from the video data storage unit 103.

(S3) The image input unit 11 performs a process of extracting a region of a predetermined object or the like for AR from the input image. The predetermined object is, for example, a car, a person, a bicycle, or the like on which an AR image is displayed to be superimposed, and a lane line or a mark on a road surface, a traffic sign, or the like used for AR control. Note that this extraction process can be realized by a known technology including image analysis such as the feature extraction and the image matching.

(S4) The image input unit 11 detects the two-dimensional coordinates (x, y) of the object position in the image, the object distance between the viewpoint position and the object position, and the like, with respect to the object 4 extracted from the input image. Alternatively, the image input unit 11 detects the three-dimensional coordinates (X, Y, Z) of the object position in space.

(S5) The image input unit 11 or the driver photographing unit 107 receives an input of an image of video data from the internal camera 3. If the viewpoint position and the like can be detected by the function of the driver photographing unit 107, the information acquisition unit 12 may be configured to acquire information of the viewpoint position and the like detected by the driver photographing unit 107.

(S6) The image input unit 11 or the driver photographing unit 107 detects the current viewpoint position of the driver from the image of the internal camera 3. The image input unit 11 or the driver photographing unit 107 detects two-dimensional coordinates (x, y) of the viewpoint position in the image or three-dimensional coordinates (X, Y, Z) of the viewpoint position in space. In addition, the image input unit 11 or the driver photographing unit 107 detects the amount of movement, the moving direction, and the like related to the viewpoint position Ex after movement from the viewpoint position E1 of the basic setting.

(S7) The information acquisition unit 12 acquires object information, viewpoint information, vehicle information, virtual image information, and the like as information necessary for the virtual image display and the correction. The object information includes information such as an object position, an object distance, an object type (for example, a car, a person, and a bicycle), and a size. The viewpoint information includes a viewpoint position, the amount of movement, and the like. The vehicle information includes a vehicle speed, a traveling direction, and the like. The virtual image information includes setting information such as the virtual image region position P1.

The information acquisition unit 12 may acquire the object distance information from, for example, the external photographing unit 102 or the sensor unit 108 (for example, distance sensor). The information acquisition unit 12 may acquire the vehicle information from, for example, the ECU 101 or the sensor unit 108. The information acquisition unit 12 may acquire the current position information of the own vehicle and the like from, for example, the sensor unit 108, the GPS receiver 105, or the car navigation unit 106. The information acquisition unit 12 may acquire the information from outside via the DB unit 109 or the communication unit 104.

(S8) The AR image generation unit 13 generates basic AR image data of the AR image 6 to be displayed and superimposed on the target object 4 by using each image and the acquired information. The basic AR image data generated here has a basic display position before correction. The AR image generation unit 13 generates an AR image in accordance with the object type or the like. The AR image generation unit 13 generates an AR image (for example, alert icon image) in accordance with the extracted object (for example, another vehicle). Also, the AR image generation unit 13 may generate an AR image (for example, navigation arrow image) with reference to data and information as appropriate from the ECU 101, the car navigation unit 106, the DB unit 109, and the like. These depend on what information is provided as the AR function, and are not particularly limited. The AR image generation unit 13 outputs the generated AR image data and the like.

(S9) The correction unit 14 performs a conversion process for correcting the display position of the AR image 6 in the virtual image region 7 with respect to the basic AR image data generated by the AR image generation unit 13. In this correction process, the correction unit 14 determines the display position of the AR image after correction in accordance with the object position, the object distance, the amount of movement of the viewpoint position, the front-back relationship of the object with respect to the virtual image region position P1, and the like. In other words, the amount of correction from the display position of the AR image before correction is determined.

The correction unit 14 determines the display position of the AR image after correction by performing a conversion process based on a predetermined conversion table (or a predetermined conversion formula). The correction unit 14 performs conversion process with reference to the conversion table with using the object position, the amount of movement of viewpoint position, the virtual image region position, and the like as input values, and outputs the display position of the AR image after correction and the like as output values.

The correction unit 14 performs the correction process for the object 4 located in front of the virtual image region 7 with using, for example, a second method described later as a correction method, and obtains the display position of the AR image after correction. In addition, the correction unit 14 compares the amount of movement of the viewpoint position in the X direction with a predetermined threshold value as a correction method, and performs the correction process when the amount exceeds the threshold value. The threshold value can be set in accordance with the eye box or the like.

(S10) The AR display unit 15 generates AR data which is the display data for the virtual image display in which the correction and the like up to S9 are reflected. Further, when generating the AR data, the AR display unit 15 also performs the coordinate transformation for adapting from the plane (virtual image plane) on the calculation in the HUD apparatus 1 to the curved region of the windshield 9 (region 307 in FIG. 3). This coordinate transformation can be realized by a known projection transformation or the like, and is a transformation for forming the planar virtual image region 7 as a result of the projection onto a curved surface.

The display unit 20 generates and emits image light based on the AR data from the AR display unit 15 of the controller 10. The image light is projected through the optical system 24 to the region 307 in the visible region 5 of the windshield 9 and is reflected. Consequently, the driver visually recognizes the AR image superimposed on the object in the virtual image region 7. When the AR function is on, the main process as described above is similarly repeated.

[Acquisition of Object Position and Viewpoint Position]

Figure 9:
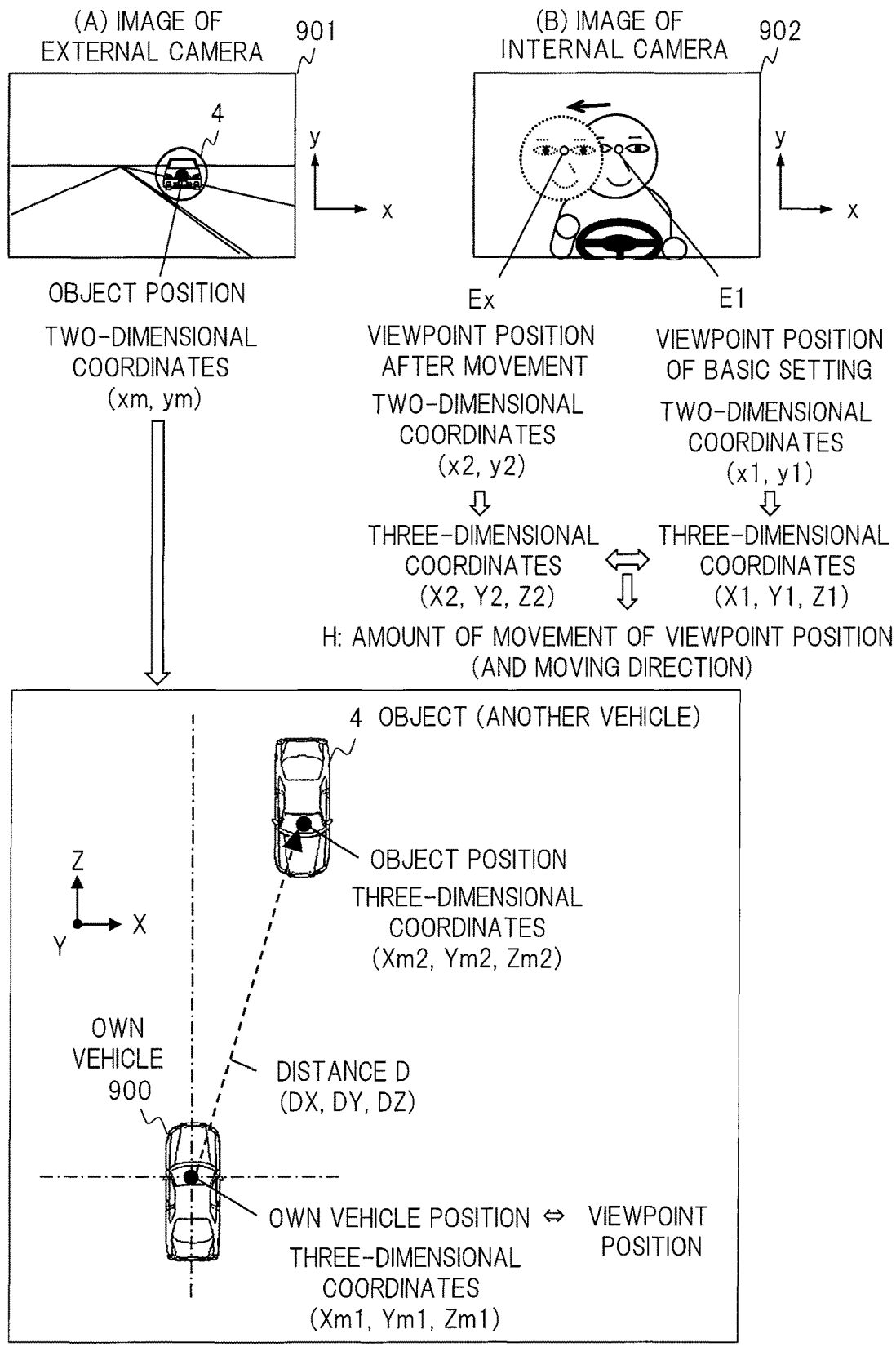
FIG. 9 is a diagram showing an acquisition of an object position and a viewpoint position according to the embodiment.

FIG. 9 shows the acquisition of the object position and the viewpoint position. (A) of FIG. 9 shows an image 901 of the external camera 2. When the image 901 includes the object 4 (for example, another vehicle), two-dimensional coordinates (xm, ym) are detected as the position of the object 4 in the image 901. Further, on the lower side of (A), the position of the own vehicle 900, the object position of another vehicle (object 4), and the distance D between the own vehicle 900 and another vehicle as the object distance are shown on the X-Z plane in space. Three-dimensional coordinates of the position of the own vehicle (Xm1, Ym1, Zm1) (associated with the viewpoint position as described above), three-dimensional coordinates of the object position (Xm2, Ym2, Zm2), and the distance D (DX, DY, DZ) are shown. The three-dimensional coordinates of the object position are position coordinates in a three-dimensional coordinate system based on the position of the own vehicle (viewpoint position). The distance DX in the distance D is a component in the X direction, the distance DY is a component in the Y direction, and the distance DZ is a component in the Z direction. The controller 10 obtains the three-dimensional coordinates and the like of the object position by using the image 901 and the above-described means.

(B) of FIG. 9 shows an image 902 of the internal camera 3. As the viewpoint positions of the driver, the viewpoint position E1 of the basic setting, the viewpoint position Ex after movement, the amount of movement H, the moving direction (including at least the X direction), and the like can be detected from the image 902. As the two-dimensional coordinates of the viewpoint position in the image 902, the viewpoint position E1 (x1, y1) and the viewpoint position Ex (x2, y2) are shown. The viewpoint position E1 and the viewpoint position Ex may be detected as two-dimensional coordinates, or may be detected as three-dimensional coordinates. The three-dimensional coordinates can be obtained based on the two-dimensional coordinates by a predetermined calculation. As the three-dimensional coordinates of the viewpoint positions, the viewpoint position E1 (X1, Y1, Z1) and the viewpoint position Ex (X2, Y2, Z2) are shown. From the difference between these viewpoint positions, the amount of movement H of the viewpoint position and the like can be detected.

Note that, although the correction of the display position is realized by using the three-dimensional information as described above in the case of correcting the display position of the AR image by the correction function of the HUD apparatus 1 according to the embodiment, the correction may be simply performed by using the two-dimensional information. Note that, if the three-dimensional coordinates of the viewpoint position and the three-dimensional coordinates of the object position can be detected, it means that a straight line connecting those two points can be detected. Moreover, the straight line may be used for control by schematically regarding it as a line of sight.

In the HUD apparatus 1 according to the embodiment, at least the two-dimensional coordinates or three-dimensional coordinates of the viewpoint position are detected by calculation by using the internal camera 3. Not limited to this, if the sight line direction (the line of sight of the eyes viewing a real image or a virtual image) and the blinking of the eyes can be detected as the function of the driver photographing unit 107, the information can be used for controlling the correction function. For example, the display position of the AR image may be controlled in accordance with the viewpoint position and the sight line direction. For example, the control in which the correction is not performed when it is found that the virtual image region 7 (the object or the AR image) is not viewed by the detection of the sight line direction is also possible.

Further, as a modification, other than the correction of the display position of the AR image in accordance with the viewpoint position and the sight line direction, the control for processing the AR image may be added. Consequently, more accurate correction and AR presentation that can be visually recognized more easily become possible. For example, when the display position of the AR image is being corrected, the process of changing the shape or color of the AR image may be performed so that the state of correction (that is, the state of changing the viewpoint position) is understood by the driver. Combination with various known technologies for visually recognizing the AR image more easily is possible.

[AR Image Generation]

FIG. 10 shows the basics when the AR image generation unit 13 generates the AR image 6 in the virtual image region 7. On the upper side of FIG. 10, a basic display position (also referred to as a display position before correction) of the AR image 6 with respect to the object position in a calculation plane (described as a virtual image plane 8) of the HUD apparatus 1 corresponding to the virtual image region 7 and the like are shown. In the two-dimensional coordinate system (x, y) in the virtual image plane 8, the AR image 6 (corresponding AR image data) is arranged for each object position of the target object 4. Based on the object position and the viewpoint position E1, the AR image generation unit 13 determines the two-dimensional coordinates (xa, ya) of the basic display position of the AR image 6 with respect to the two-dimensional coordinates (xm, ym) of the object position on the virtual image plane 8. The two-dimensional coordinates (xa, ya) of the basic display position of the AR image on the virtual image plane 8 are obtained by a predetermined calculation based on the three-dimensional coordinates of the object position and the viewpoint position and the distance between the two.

In this example, the case where the object 4 is another vehicle (oncoming vehicle) and an alert icon image for alerting is displayed to be superimposed as the AR image 6 is shown. An example of the alert icon image has an arch shape and is displayed so as to appear in parallel to the road surface. In this example, the center of the lower side of the object region of the object 4 is defined as the basic display position of the AR image, but the basic display position is not limited to this. Based on the basic image of the alert icon image, the AR image whose inclination and the like are adjusted in accordance with the road surface is generated. Then, the AR image is arranged at the basic display position in the virtual image plane 8. Further, the color, size, and the like of the AR image may be adjusted at this time. For example, the AR image may be adjusted to have a color in accordance with the type of the object or a size in accordance with the size of the object region.

On the lower side of FIG. 10, another example of the AR image is shown. In this example, the object 4 is another vehicle and the AR image 6 is a frame image surrounding the object 4 (object region). Further, in this example, an arrow image for navigation of the traveling direction is displayed as the AR image 6 at a forward position on the road. Also, when the object 4 is a predetermined facility or signboard, a word balloon image is displayed as the AR image 6 at a related position slightly apart from the object position in this example. In the word balloon image, information of the object 4 (for example, information of a facility or a signboard based on the reference to the car navigation unit 106 and the DB unit 109) is displayed in characters or the like.

As in the example described above, various types of AR images are possible. Note that the correction function can be similarly applied even when the display position is slightly apart from the object position as in the word balloon image as a type of the AR image. It is also possible to set whether to apply the correction function to the word balloon image. When the word balloon image is corrected, the positional relationship between the object and the word balloon image is maintained before and after the correction. When the correction is performed, how it looks such as the distance between the object and the word balloon image changes in accordance with the viewpoint position. Although not shown, another example of the AR image may be a lane line image (image for highlighting the lines at the left and right ends of the road) or the like.

[Correction Method (1)]

In the embodiment, as the correction function, the content of the correction of the display position of the AR image is controlled in accordance with the object position, the amount of movement of the viewpoint position, and the positional relationship between the virtual image region and the object. For this correction function, the following methods are used.

First, as shown in FIG. 1, when correcting the display position of the AR image by the correction function in the HUD apparatus 1 according to the embodiment, the process of correcting the content of the AR data (display data given to the display unit 20) is performed in the controller 10. The correction process can be realized by the conversion process using, for example, a conversion table based on the software program processing of the controller 10.

Regarding the means for realizing this correction, as the HUD apparatus according to a modification, the control for changing the angles $\theta$, $\phi$, and the like of the mirror 501 of the optical system 24 of the display unit 20 in the hardware of the HUD apparatus may be applied. Alternatively, the control using the information processing of the AR data described above and the drive control of the optical system 24 in combination may also be applied.

[Correction Method (2)]

Figure 11:
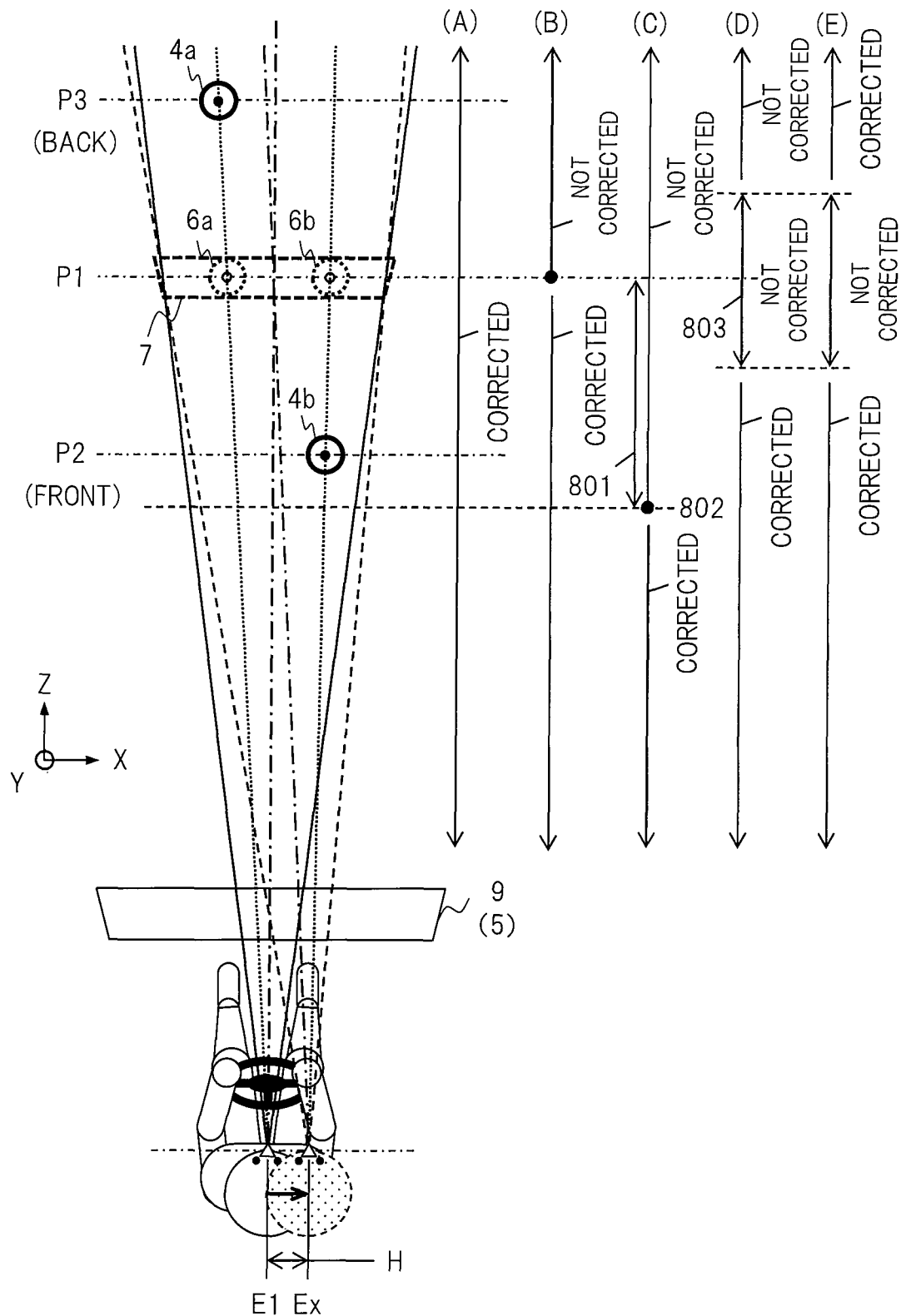
FIG. 11 is a diagram showing a correction method in accordance with a front-back relationship between the object and the virtual image region according to the embodiment.

FIG. 11 shows a correction method of the display position of the AR image in the correction function of the HUD apparatus 1 according to the embodiment. In this correction method, in particular, the correction is controlled in accordance with the front-back positional relationship between the object 4 and the virtual image region 7 in the Z direction. In the correction function, the display position of the AR image is corrected by using at least one of the methods described below. In the HUD apparatus 1, the correction function based on at least one of the methods is implemented in advance as a design matter. Alternatively, the HUD apparatus 1 may be configured so that the method selected by a user from the plurality of methods can be set as the method to be used by using a user setting function. Further, in the HUD apparatus 1, the method to be used may be switched among a plurality of methods depending on the situation. The effect of correction in accordance with the used method can be realized.

(A) First method: First, as the basic correction method, in the first method, the correction is similarly applied regardless of the position of the object 4 with respect to the virtual image region 7 in the Z direction. The HUD apparatus 1 determines the display position after correction of the AR image 6 in the X direction in the virtual image region 7 in accordance with the object position and the amount of movement H of the viewpoint position.

(B) Second method: Further, in the second method and the like, whether or not to apply the correction is controlled in at least two sections of the case where the object 4 is located at the back of the virtual image region 7 (virtual image region position P1) in the Z direction and the case where the object 4 is located in front of the virtual image region 7. As shown in FIG. 7, the case where the object 4 is located at the back of the virtual image region 7 is the case of the object 4a at the position P3, in other words, the case where the object distance LA is larger than the virtual image distance LB (LA LB). The case where the object 4 is located in front of the virtual image region 7 is the case of the object 4b at the position P2, in other words, the case where the object distance LA is smaller than the virtual image distance LB (LA<LB). In the second method, the HUD apparatus 1 corrects the display position of the AR image 6 when the object 4 is located in front of the virtual image region 7 as the positional relationship, and the HUD apparatus 1 does not correct the display position when the object 4 is located at the virtual image region position P1 or at the back of the virtual image region position P1. In the example of FIG. 11, the correction is performed for the object 4b located in front of the virtual image region 7 as viewed from the viewpoint position Ex after movement, and the AR image 6b after correction is shown. For the object 4a located at the back of the virtual image region 7, the AR image 6a from the viewpoint position E1 is not corrected, and the AR image 6a before correction is shown.

(C) Third method: As a modification of the second method, the third and following methods may be used. In the third method, a threshold position for control is set at a position 802 with a predetermined distance 801 in front of the virtual image region position P1 in the Z direction. In the third method, the HUD apparatus 1 performs the correction when the object position is located in front of the position 802, and does not perform the correction when the object position is located at the back of the position 802. In the third method, as a concept, the correction is not performed when the object position is located between the virtual image region position P1 and the position 802 because the object 4 and the virtual image region 7 are relatively close and the influence of the shift is relatively small.

(D) Fourth method: In the fourth method, a range 803 with a predetermined distance extending in front of and at the back of the virtual image region position P1 is set as a virtual image region proximity range which is a control range. In the fourth method, three sections such as the range 803 and those located in front of and at the back of the range 803 are provided. In the fourth method, the HUD apparatus 1 does not perform the correction when the object position is located in the range 803. When located in the range 803, the correction is not performed because the object 4 and the virtual image region 7 are relatively close and the influence of the shift is relatively small. Further, in the fourth method, the correction is performed when the object position is outside the range 803 and in front of the range 803, and the correction is not performed when the object position is outside the range 803 and at the back of the range 803.

(E) Fifth method: As a modification of the fourth method, in the fifth method, the correction is not performed when the object position is within the range 803, the correction is performed when the object position is outside the range 803 and in front of the range 803, and the correction is performed when the object position is outside the range 803 and at the back of the range 803.

Since the influence of the shift becomes larger as the distance from the object position to the virtual image region position P1 (virtual image object distance FC) becomes larger, there is the higher necessity and effectiveness of the correction. In addition, since the influence of the shift becomes larger when the object is located in front of the virtual image region 7, there is the higher necessity and effectiveness of the correction. In each of the above-described correction methods, at least when the object is located in front of the virtual image region 7, the correction is reliably performed, so that the shift is eliminated or reduced.

[Correction Method (3)]

FIG. 12 shows a correction method in accordance with the amount of movement of the viewpoint position as a correction method additionally applied in the HUD apparatus 1 according to the embodiment. In this correction method, whether or not to apply the correction to the display position of the AR image is controlled in accordance with the magnitude of the amount of movement H of the viewpoint position in the X direction, that is, whether the amount of movement H is within a predetermined threshold value or exceeds the threshold value.

(A) of FIG. 12 shows the case where the amount of movement H is the amount of movement Hx1 at the viewpoint position Ex1 after movement to the right from the viewpoint position E1 of the basic setting and the amount of movement Hx1 is within a predetermined threshold value Ht. The case where the object 4a located at the position P3 at the back of the virtual image region 7 and the object 4b located at the position P2 in front of the virtual image region 7 are present is shown. In this case, since the amount of movement Hx1 is within the threshold value Ht, the HUD apparatus 1 does not perform the correction using the above-described first method, second method, and the like. As a concept, in this case, the shift between the object 4a or the object 4b and the AR image 6a before correction is within an acceptable range in the visual recognition from the viewpoint position Ex1. For this reason, the correction process is omitted to improve the efficiency.

Similarly, (B) of FIG. 12 shows the case where the amount of movement H is the amount of movement Hx2 (Hx2>Hx1) at the viewpoint position Ext after movement from the viewpoint position E1 of the basic setting and the amount of movement Hx2 exceeds the predetermined threshold value Ht. In this case, since the amount of movement Hx2 exceeds the threshold value Ht, the HUD apparatus 1 performs the correction using the above-described first method, second method, and the like. As a concept, in this case, the shift between the object 4a or the object 4b and the AR image 6a before correction is out of the acceptable range in the visual recognition from the viewpoint position Ext. For this reason, the correction process is performed to eliminate the shift.

At the virtual image region position P1, a position 121 indicates the display position of the AR image 6a before correction. When the object 4b is located at the position P2 in front of the virtual image region 7 and the correction is performed, a position 122 indicates the display position of the AR image after correction. Similarly, when the object 4a is located at the position P3 at the back of the virtual image region 7 and the correction is performed, a position 123 indicates the display position of the AR image after correction.

[Correction]

FIG. 13 shows correction and conversion of the display position of the AR image by the correction unit 14. In the conversion process, the correction unit 14 receives, as input values, the object position (for example, three-dimensional coordinates), the amount of movement from the viewpoint position E1 of the basic setting, the virtual image region position P1, and the display position of the AR image before correction, and acquires the display position (or the amount of correction) of the AR image after correction as an output value as a result of the conversion.

The example of FIG. 13 shows the case where the object positions are the position P3 at the back of the virtual image region position P1 and the position P2 in front of the virtual image region position P1, and are the positions displaced slightly to the left from the center in the X direction. Further, the case where the viewpoint position moves rightward from the viewpoint position E1 of the basic setting to the viewpoint position Ex after movement with the amount of movement Hx is shown as the movement of the viewpoint position.

In the virtual image region 7, the display position when displaying the AR image 6 aligned with the object 4a at the position P3 or the object 4b at the position P2 from the viewpoint position E1 is indicated as a position QB of the AR image 6B before correction. Although not shown, when an object is located at the position QB at the virtual image region position P1=PB, the display position of the AR image is at the same position QB.

In the case of the first method and the like, the case where the display position is corrected for the object 4a located at the back of the virtual image region 7 is as follows. The HUD apparatus 1 corrects the display position (position QB) of the AR image 6B of the object 4a at the position P3 in accordance with the viewpoint position Ex after movement. By the conversion process, the display position after correction is determined as a position QA. The position QA is obtained as an intersection between a line of the virtual image region 7 in the X direction and a straight line for viewing the object 4a from the viewpoint position Ex. The HUD apparatus 1 displays the AR image 6A at the position QA after correction.

In the case of the first method, the second method, and the like, the case where the display position is corrected for the object 4b located in front of the virtual image region 7 is as follows. The HUD apparatus 1 corrects the display position (position QB) of the AR image 6B of the object 4b at the position P2 in accordance with the viewpoint position Ex after movement. By the conversion process, the display position after correction is determined as a position QC. The position QC is obtained as an intersection between the line of the virtual image region 7 in the X direction and a straight line for viewing the object 4b from the viewpoint position Ex. The HUD apparatus 1 displays the AR image 6C at the position QC after correction.

[Example of Positional Relationship]

Figure 14:
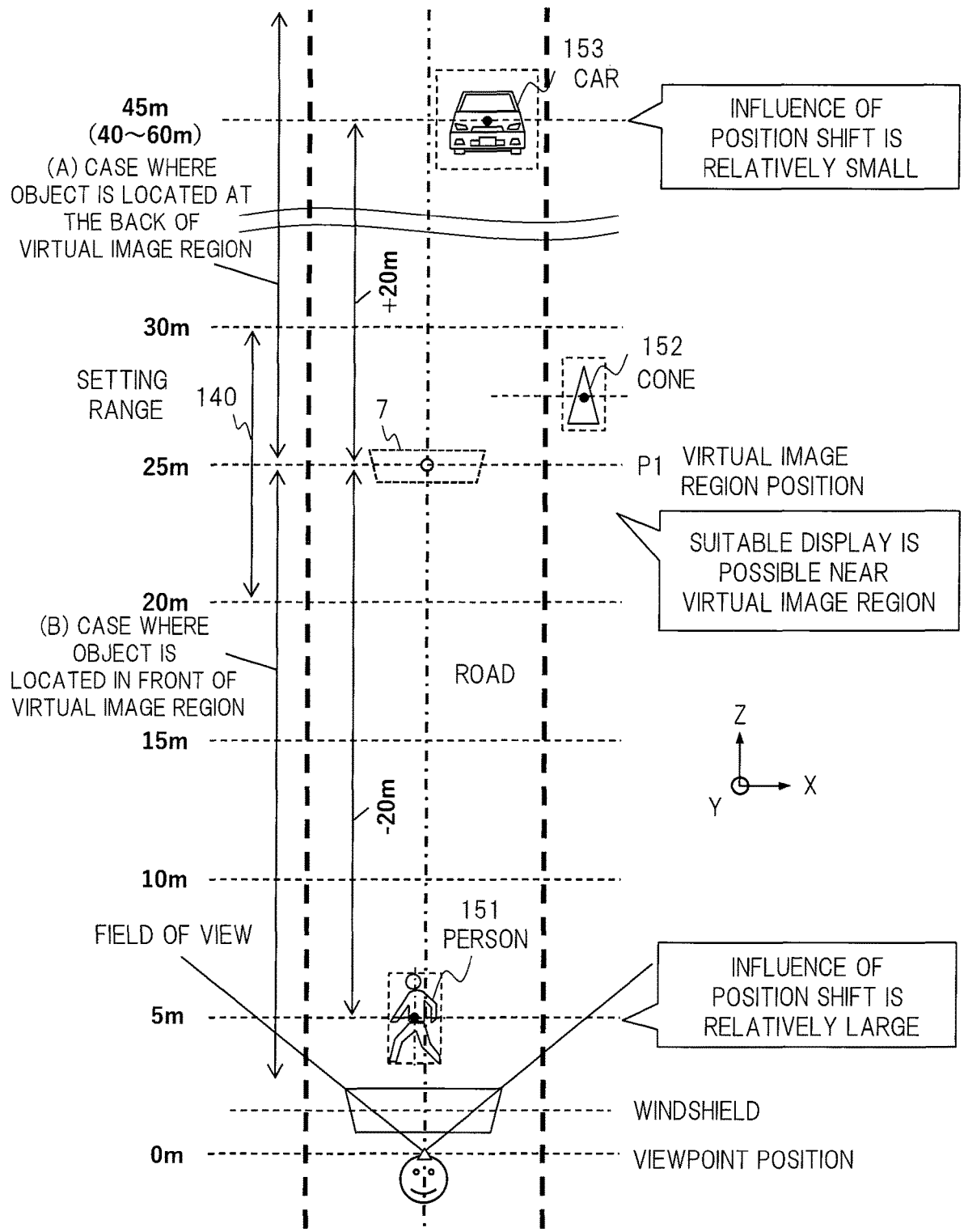
FIG. 14 is a diagram showing an example of a relationship between a position and a distance of a viewpoint, an object, and a virtual image according to the embodiment.

FIG. 14 shows an example of the relationship between the position and the distance of the viewpoint, the object, and the virtual image. An example in which the object virtual image distance LC and the like are different will be described. FIG. 14 shows an X-Z plane in which the road and the like are seen from above. For example, the virtual image region position P1 (including the AR image display position) is set within a range of 20 to 30 m (setting range 140) as the virtual image distance LB from the viewpoint position of the own vehicle. In this example, the case where the virtual image region position P1 is set at a position with the virtual image distance FB of 25 m is shown.

The case where a person 151, a cone 152, a car 153, and the like are the objects 4 to be the targets for AR is shown. The person 151 (pedestrian or the like) is located at a relatively close position in front of the virtual image region position P1 with a distance of 5 m from the viewpoint position. The object virtual image distance LC is −20 m (the object virtual image distance LC in the case where the object is in front of the virtual image region position P1 is defined as negative). The cone 152 is located at a position near the virtual image region position P1, that is, within the setting range 140 with a distance of 20 to 30 m from the viewpoint position. The car 153 (oncoming car or the like) is located at a relatively far position at the back of the virtual image region position P1 with a distance of about 40 to 60 m (for example, 45 m) from the viewpoint position. The object virtual image distance LC is +20 m.

First, when the object 4 is located at the position near the virtual image region 7 (virtual image region position P1) within the setting range 140 like the cone 152, the influence of the shift of the display position of the AR image 6 is small, and a suitable AR image display is possible.

The car 153 is located at the position at the back of the virtual image region position P1, and the object virtual image distance LC is +20 m. For the AR image to be superimposed on the position of the car 153, there is the influence of the shift, but the influence is smaller as compared with the case of the object located in front of the virtual image region position P1 like the person 151. Therefore, the AR image of the car 153 may be corrected based on the first method and the like, or the correction may be omitted based on the second method and the like.

The person 151 is located at the position in front of the virtual image region position P1, and the object virtual image distance LC is −20 m. For the AR image superimposed on the position of the person 151, the influence of the shift is larger as compared with the case where the object is located at the back of the virtual image region position P1 like the car 153. Therefore, for the AR image of the person 151, it is important to eliminate the shift, and the correction is reliably performed.

For example, when the above-mentioned second method is applied, the correction process for an object such as the car 153 located at the back of the virtual image region 7 is omitted to improve efficiency, and the shift is eliminated by the correction for an object such as the person 151 located in front of the virtual image region 7, thereby achieving the visual recognition suitable for the driver.

FIG. 15 shows an example of the object and the AR image corresponding to the example of FIG. 14. (A) on the upper side of FIG. 15 simply shows an example of the object 4 viewed from the viewpoint position E1 of the basic setting. The person 151 is present as the object 4 on the road at a position relatively close to the own vehicle. In addition, the car 153 is present as the object 4 at a position relatively far from the own vehicle. Further, at an intermediate position between them, the cone 152 is present as the object 4 placed near the corner. As an object position 154, the two-dimensional coordinates (x, y) of the object position in the case of the person 151 are shown, and the object position 154 is set at the center point of an object region 155 in this case. The object region 155 corresponds to the region surrounding the person 151 as the object 4 (for example, a rectangle including the shape of the person 151), and is indicated by a broken line frame. The object region is not limited to a rectangle, and any shape can be adopted for the object region.

(B) on the lower side of FIG. 15 shows an example of the superimposed display of the AR image 6 on the object 4 of (A). The example in which an alert icon image is displayed to be superimposed as the AR image 6 on each of the person 151, the cone 152, and the car 153 is shown. For example, a display position 156 indicates the basic display position of the AR image 6 before correction in the case of the person 151. The case where the display position of the AR image 6 for the object position 154 and the object region 155 is set to the center of the lower side of the object region 155 located below the object position 154 is shown, but the display position is not limited to this, and the object position may be directly used as the display position of the AR image.

Figure 16:
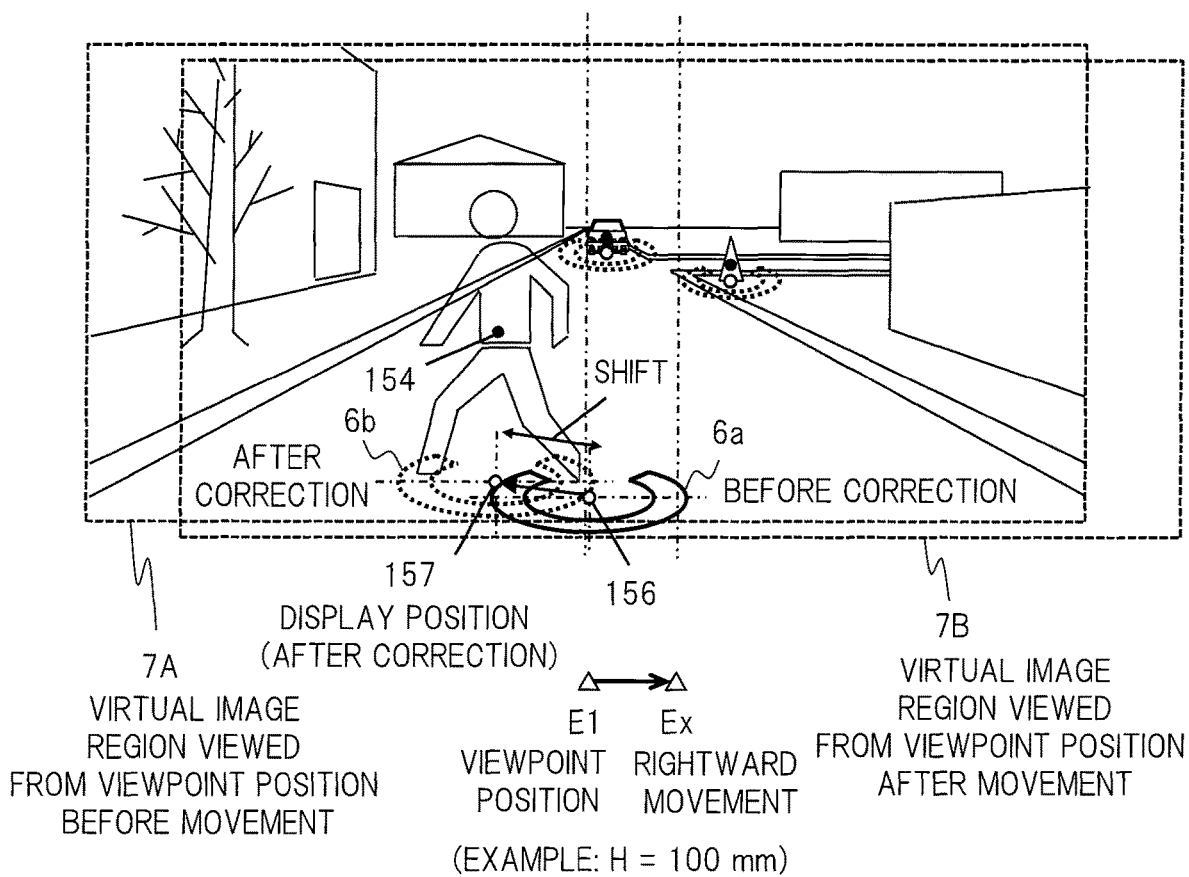
FIG. 16 is a diagram showing an example of the shift between the object and the AR image and the correction thereof when the viewpoint position moves according to the embodiment.

FIG. 16 shows the position shift between the object and the AR image and the correction corresponding to the examples of FIG. 14 and FIG. 15. The virtual image regions 7 before and after movement of the viewpoint position are simply shown. A virtual image region 7A indicates the virtual image region viewed from the viewpoint position E1 of the basic setting before movement. A virtual image region 7B indicates the virtual image region viewed from the viewpoint position Ex after movement to right from the viewpoint position E1. The amount of movement H is, for example, 100 mm. In the state before correction, there is a position shift between the person 151 as the object 4 and the AR image 6a (AR image before correction) as viewed from the viewpoint position Ex. In the state after correction, the position shift has been eliminated between the person 151 and the AR image 6b (AR image after correction) as viewed from the viewpoint position Ex. By the correction, the display position 156 of the AR image 6a before correction is changed to the display position 157 of the AR image 6b after correction.

In particular, when the object 4 is located in front of the virtual image region 7 and the object virtual image distance LC is relatively large as in the example of the person 151, the influence of the shift is large, and thus the correction of the display position is effective. Although the object virtual image distance LC is 20 m for both the person 151 and the car 153, the influence of the shift is larger for the person 151 than for the car 153. Therefore, the display position of the AR image is reliably corrected for the person 151 by using the second method and the like.

[Modification: Variable Setting of Virtual Image Region]

Figure 17:
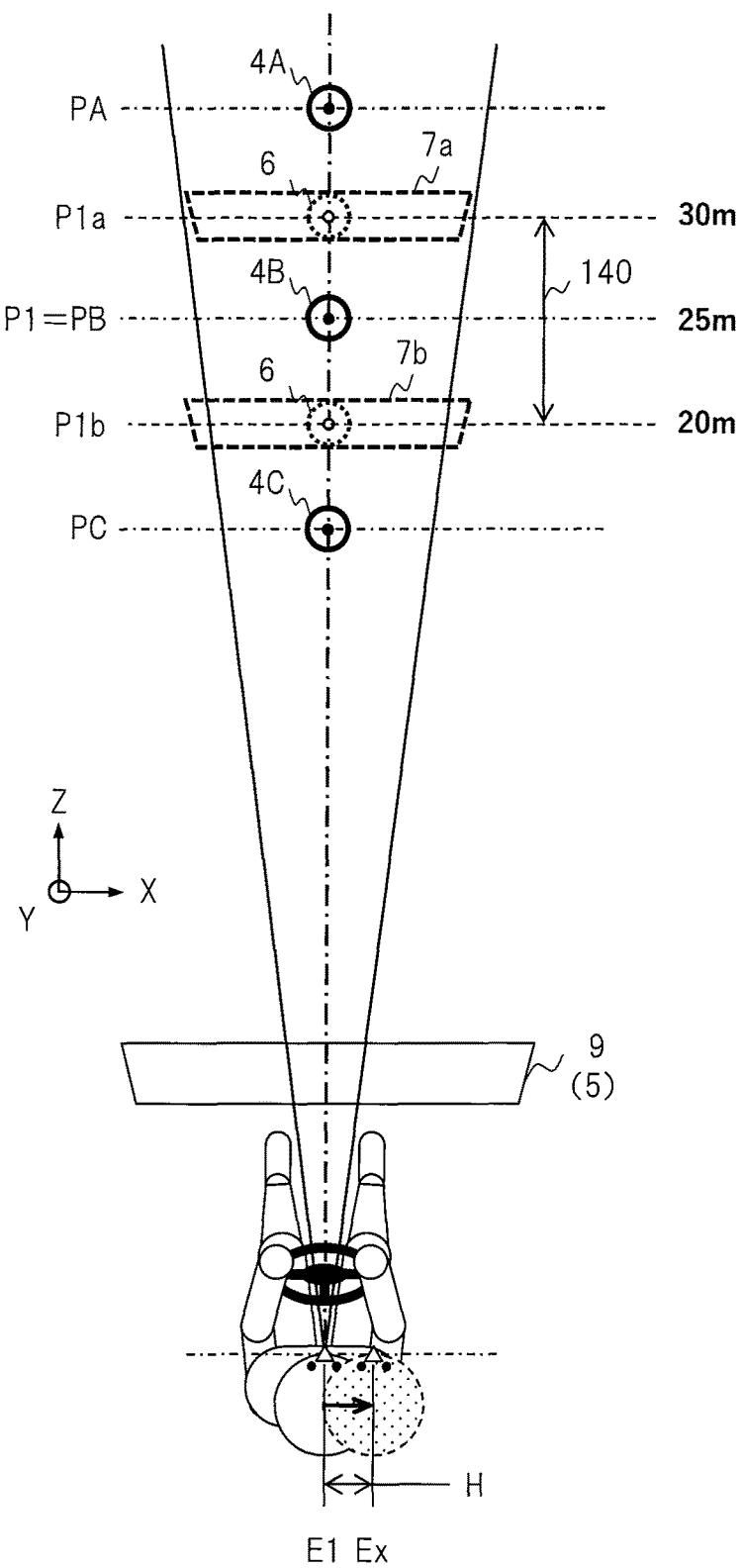
FIG. 17 is a diagram showing a variable setting of the position of the virtual image region according a modification of the embodiment.

FIG. 17 shows variable setting of the position of the virtual image region 7 in the Z direction in the HUD apparatus 1 according to a modification. The virtual image region position P1 can be variably set within the predetermined setting range 140 (20 to 30 m). A position P1a indicates a position of a virtual image region 7a in the case where the position with the virtual image distance FB of 30 m is set as the virtual image region position. A position P1b indicates a position of a virtual image region 7b in the case where the position with the virtual image distance FB of 20 m is set as the virtual image region position. Also, the case where the object 4 is located at the positions (PA, PB, PC) with respective object distances is shown. The object 4A at the position PA, the object 4B at the position PB, and the object 4C at the position PC are shown.

Even in the case of setting each virtual image region 7, the correction function can be similarly applied. For example, it is assumed that the above-described second method is applied. In the case of the virtual image region 7a, the correction is performed for the object 4C and the object 4B because they are located in front of the virtual image region 7a, and the correction is not performed for the object 4A because it is located at the back of the virtual image region 7a. In the case of the virtual image region 7b, the correction is performed for the object 4C because it is located in front of the virtual image region 7b, and the correction is not performed for the object 4A and the object 4B because they are located at the back of the virtual image region 7b.

Note that the plane of the virtual image region 7 (for example, a rectangular plane) set based on the road surface, the vehicle, and the conditions of the driver may be an X-Y plane or a plane having the line of sight 301 from the viewpoint position E1 as a normal line as in the example of FIG. 3. The correction function can be similarly applied in each case.

[Modification: Virtual Image Region]

Figure 18:
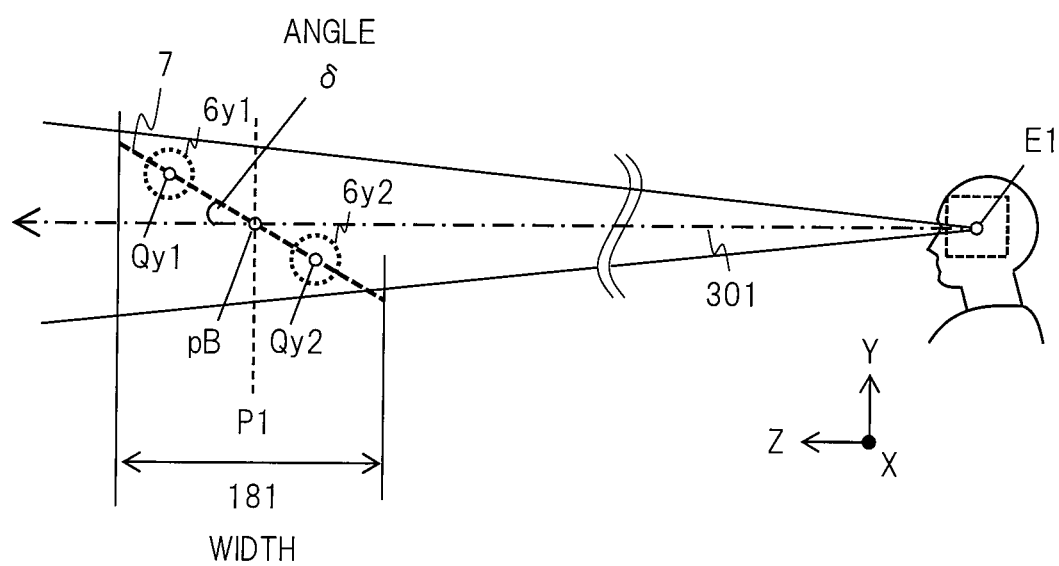
FIG. 18 is a diagram showing a setting example of the virtual image region according to a modification of the embodiment.

FIG. 18 shows a setting state of the virtual image region 7 according to another modification. In this manner, the virtual image region 7 is not limited to a plane perpendicular to the line of sight 301 from the viewpoint position E1, but may be a plane inclined obliquely. In this example, the virtual image region 7 is set as a plane having an angle δ with respect to the line of sight 301 in the Z direction. Further, the angle δ may be variably set. In this case, the virtual image region 7 has a width 181 in the Z direction with the virtual image region position P1 in the Z direction and the position pB on the line of sight 301 as a center. The width 181 has a size within the setting range 140. Also in this case, the correction function can be similarly applied. In this example, an AR image 6y1 at a position Qy1 and an AR image 6y2 at a position Qy2 are shown as the AR images 6 in the virtual image region 7. The position Qy1 is a position above the line of sight 301 in the Z direction and a position at the back of the virtual image region position P1. The position Qy2 is a position below the line of sight 301 in the Z direction and a position in front of the virtual image region position P1.

In the case of this modification, for example, the fourth method of (D) in FIG. 11 and the fifth method of (E) in FIG. 11 can be similarly applied as the correction method. For example, whether or not to apply the correction may be controlled by making the width 181 correspond to the range 803 of (D).

[Control in Case of Outside of Virtual Image Region]

Figure 19:
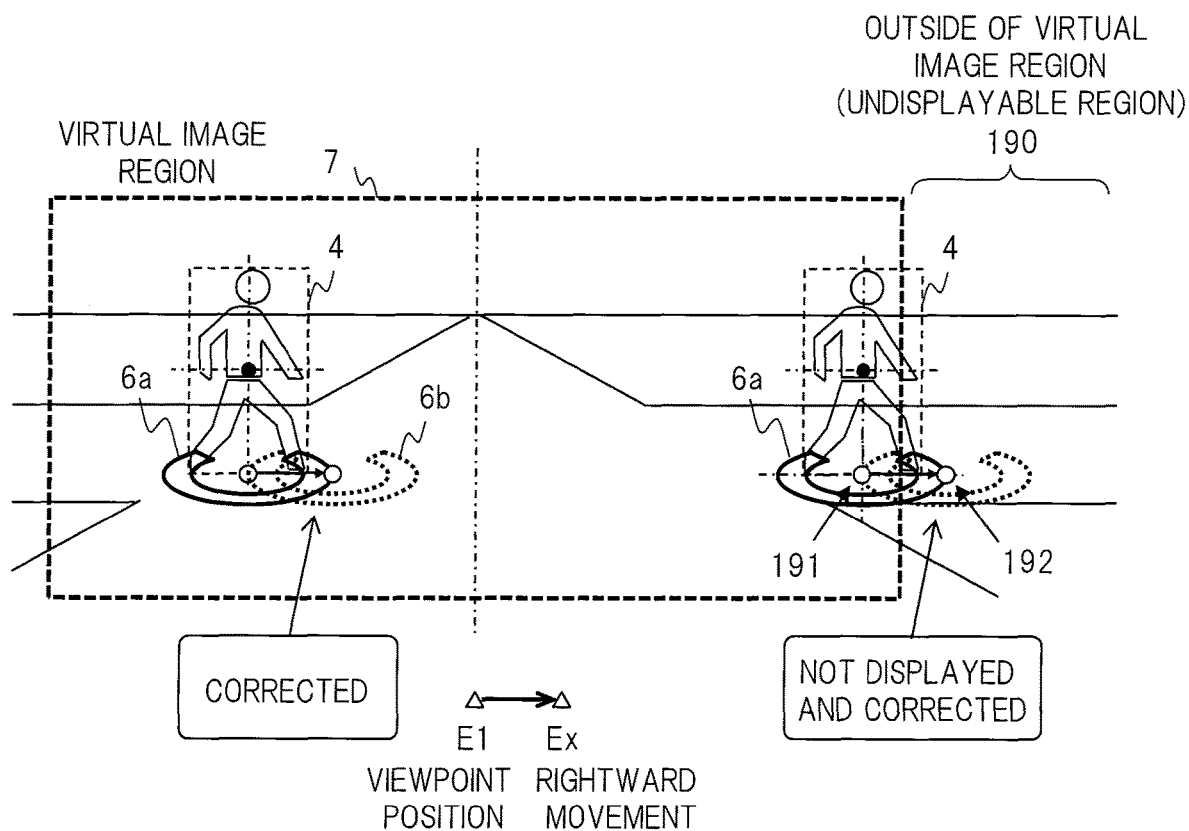
FIG. 19 is a diagram showing a control in the case of the outside of the virtual image region according to the embodiment.

FIG. 19 shows control in the case of outside of the virtual image region 7 as a part of the correction function. The control in the case where the display position of the AR image after correction goes out of the virtual image region 7 in accordance with the amount of movement of the viewpoint position will be described.

(1) As this control, in the first control, when the display position of the AR image 6 related to the object 4 is within the virtual image region 7 in consideration of the virtual image region 7 (corresponding virtual image plane) viewed from the viewpoint position, the AR image can be displayed and the display position of the AR image is corrected. Further, in this control, when the display position of the AR image 6 related to the object 4 (the display position calculated at the time of correction) is outside the virtual image region 7 in consideration of the virtual image region 7 (corresponding virtual image plane) viewed from the viewpoint position, the correction of the display position of the AR image is not performed, and the AR image is not displayed. An outside 190 of virtual image region (undisplayable region) shows an example of an outside region on a right side of the virtual image region 7. A position 191 is a display position of the AR image 6a calculated in accordance with the viewpoint position E1 of the basic setting. A position 192 is a display position calculated for correction in accordance with the viewpoint position Ex after movement. The position 192 is located in the outside 190 of virtual image region. In the first control, in the case of the outside 190 of virtual image region, the AR image is not displayed and corrected simply. When the viewpoint position returns, that is, when the display position after correction returns to the inside of the virtual image region 7, correction is performed and the AR image is displayed again.

(2) In the second control, when the HUD apparatus 1 determines that the viewpoint position views the inside of the virtual image region 7 or the display position after correction is inside the virtual image region 7 in the normal state, the HUD apparatus 1 automatically turns on the correction function and performs the correction and display. When the HUD apparatus 1 determines that the viewpoint position does not view the virtual image region 7 or the display position after correction is outside the virtual image region 7, the HUD apparatus 1 automatically switches the correction function to the off state and does not perform the correction and display. In the latter case, it is judged that the driver cannot see the AR image in the virtual image region 7 or does not see the AR image intentionally, and the HUD apparatus 1 turns off the correction function. Depending on the situation, when the driver does not want to see the virtual image or wants to see only the real image, the driver may move the viewpoint position for that purpose. Even in such a case, the driver can easily see only the object without seeing the AR image by applying the above control.

(3) In the third control, when the display position of the AR image after correction goes out of the virtual image region 7 based on the viewpoint position, the HUD apparatus 1 does not perform correction and displays the AR image while maintaining the display position before correction. Namely, the AR image before correction remains displayed at the position near the left or right end of the virtual image region 7. When returning to the inside of the virtual image region 7, the necessity of correction is determined again. In the case of this control, the shift between the object and the AR image remains in the visual recognition by the driver, and the driver recognizes the shift. If the driver wants to see the object by changing the viewpoint, the driver can easily see the object because the superimposition of the AR image is displaced.

Effects, Etc

As described above, with the HUD apparatus 1 according to the embodiment, the shift between an object and a virtual image (AR image) can be reduced, and a suitable AR display can be realized. In particular, it is possible to realize suitable correction in accordance with the viewpoint position and the virtual image region position.

In the foregoing, the present invention has been specifically described based on the embodiment, but the present invention is not limited to the embodiment and various changes can be made within the scope of the present invention. The addition, deletion, separation, connection, replacement, and combination of the component of the embodiment are possible. A part or all of the function of the embodiment may be implemented by hardware such as an integrated circuit or by software program processing. Each software may be stored in the apparatus in advance at the time of the product shipment or may be acquired through communication from the external apparatus after the product shipment.

The correction by the correction function according to the embodiment can be similarly applied not only in the horizontal direction (X direction) but also in the vertical direction (Y direction). The present invention can be applied to various uses in addition to the in-vehicle system.

REFERENCE SIGNS LIST

1: HUD apparatus, 2: external camera, 3: internal camera, 4: object, 5: visible region, 6 (6a, 6b): AR image, 7: virtual image region, 9: windshield, 10: controller, 20: display unit, E1, Ex: viewpoint position, P1: virtual image region position, P2: position

The invention claimed is:

1. A head up display apparatus configured to project an image to a windshield or a combiner of a vehicle, thereby displaying a virtual image to be superimposed on a real image in front of the vehicle for a driver, the head up display apparatus comprising:

a controller configured to perform control to display the virtual image in a visible region of the windshield or the combiner; and a display unit configured to display the virtual image in the visible region in accordance with the control of the controller, wherein the controller extracts a predetermined object based on an image taken by an external camera, wherein the controller acquires information including object information including an object position of the object in space, viewpoint information including a viewpoint position of the driver and the amount of movement of the viewpoint position in space based on an image taken by an internal camera, and virtual image information including a position of a virtual image region which is a range in which the virtual image can be displayed in space, wherein the controller generates the image displayed to be superimposed on the object, wherein the controller corrects a display position of the image in the virtual image region including at least a position in a horizontal direction by using the acquired information, wherein the controller performs the control to the display unit by using data after the correction, wherein the controller performs conversion process at the time of the correction so that a position of an intersection between a straight line when viewing the object position through the visible region from a viewpoint position after movement from a viewpoint position of basic setting of the driver and the virtual image region is set as a display position of the image after correction, wherein the virtual image region is set at a virtual image region position with a predetermined virtual image distance ahead of the visible region as viewed from the viewpoint position of the driver, and wherein the controller determines whether or not to perform the correction of the display position of the image in each of a first case where the object position is located at the back of the virtual image region position and a second case where the object position is located in front of the virtual image region position.

2. The head up display apparatus according to claim 1, wherein the controller performs the conversion process with using a basic display position of the generated image, the object position, the amount of movement of the viewpoint position, and the position of the virtual image region as input values and with reference to a conversion table or a conversion calculation formula, thereby acquiring the display position of the image after correction as an output value.

3. The head up display apparatus according to claim 1, wherein the controller performs control so that the correction is not performed when the amount of movement of the viewpoint position is within a threshold value and the correction is performed when the amount of movement exceeds the threshold value.

4. The head up display apparatus according to claim 1, wherein whether or not to perform the correction can be set in accordance with a type of the object and a type of the image.

5. The head up display apparatus according to claim 1 mounted in an in-vehicle system of the vehicle,
wherein the display unit includes a projection display apparatus configured to perform projection display to the visible region of the windshield or the combiner.

6. The head up display apparatus according to claim 1, wherein the display unit includes:
an optical system for guiding image light of the image to the visible region, the optical system having a mirror whose angle is variable and having a configuration in which a projection position of the image light to the visible region is changed in accordance with the angle, thereby changing the position of the virtual image region seen in the visible region; and
a drive unit configured to drive the optical system so as to change the angle of the mirror based on an operation by the driver or the control of the controller, and wherein the viewpoint position and the position of the virtual image region of the basic setting are set in accordance with the angle of the mirror.

7. A display control method in a head up display apparatus configured to project an image to a windshield or a combiner of a vehicle, thereby displaying a virtual image to be superimposed on a real image in front of the vehicle for a driver, the head up display apparatus comprising:
a controller configured to perform control to display the virtual image in a visible region of the windshield or the combiner; and
a display unit configured to display the virtual image in the visible region in accordance with the control of the controller, wherein steps performed by the controller include:
a step of extracting a predetermined object based on an image taken by an external camera;
a step of acquiring information including object information including an object position of the object in space, viewpoint information including a viewpoint position of the driver and the amount of movement of the viewpoint position in space based on an image taken by an internal camera, and virtual image information including a position of a virtual image region which is a range in which the virtual image can be displayed in space;
a step of generating the image displayed to be superimposed on the object;
a step of correcting a display position of the image in the virtual image region including at least a position in a horizontal direction by using the acquired information; and
a step of performing the control to the display unit by using data after the correction, wherein, in the step of correcting the display position, conversion process is performed so that a position of an intersection between a straight line when viewing the object position through the visible region from a viewpoint position after movement from a viewpoint position of basic setting of the driver and the virtual image region is set as a display position of the image after correction, wherein the virtual image region is set at a virtual image region position with a predetermined virtual image distance ahead of the visible region as viewed from the viewpoint position of the driver, and wherein the controller determines whether or not to perform the correction of the display position of the image in each of a first case where the object position is located at the back of the virtual image region position and a second case where the object position is located in front of the virtual image region position.

* * * * *